(12) United States Patent  (10) Patent No.: US 8,145,718 B1
Kacker et al.  (45) Date of Patent: Mar. 27, 2012

(54) SECURE MESSAGING SYSTEM WITH PERSONALIZATION INFORMATION

(75) Inventors: Rishi R. Kacker, San Francisco, CA (US); Matthew J. Pauker, San Francisco, CA (US); Guido Appenzeller, Menlo Park, CA (US); Terence Spies, San Mateo, CA (US)

(73) Assignee: Voltage Security, Inc., Cupertino, CA (US)

( * ) Notice: Subject to any disclaimer, the term of this patent is extended or adjusted under 35 U.S.C. 154(b) by 1183 days.

(21) Appl. No.: 11/581,056

(22) Filed: Oct. 13, 2006

Related U.S. Application Data

(60) Provisional application No. 60/729,483, filed on Oct. 21, 2005.

(51) Int. Cl.
*H04L 9/00* (2006.01)
(52) U.S. Cl. ............ 709/206; 713/176; 713/153; 726/3
(58) Field of Classification Search ............... 709/206; 713/176, 153; 726/3
See application file for complete search history.

(56) References Cited

U.S. PATENT DOCUMENTS

| | | | |
|---|---|---|---|
| 7,523,314 B2 * | 4/2009 | Spies et al. | 713/176 |
| 7,690,035 B2 * | 3/2010 | Sasage et al. | 726/22 |
| 7,783,709 B2 * | 8/2010 | Liezenberg et al. | 709/206 |
| 2002/0116508 A1 * | 8/2002 | Khan et al. | 709/229 |
| 2002/0178353 A1 * | 11/2002 | Graham | 713/151 |
| 2004/0025057 A1 * | 2/2004 | Cook | 713/201 |
| 2004/0036907 A1 * | 2/2004 | Simpson et al. | 358/1.15 |
| 2004/0098589 A1 * | 5/2004 | Appenzeller et al. | 713/170 |
| 2004/0179684 A1 * | 9/2004 | Appenzeller et al. | 380/44 |
| 2005/0015457 A1 * | 1/2005 | Warasawa | 709/207 |

(Continued)

FOREIGN PATENT DOCUMENTS

WO   WO 2005048522 A1 *   5/2005

OTHER PUBLICATIONS

Characteristics and responsibilities involved in a Phishing attack., Invited workshop on information technology and its applications: software development, disaster engineering, and security., Proceedings of the 4th international symposium on Information and communication technologies, Cape Town, South Africa., Jan. 2005.*

(Continued)

*Primary Examiner* — Wing Chan
*Assistant Examiner* — Kostas Katsikis
(74) *Attorney, Agent, or Firm* — Treyz Law Group; G. Victor Treyz; David C. Kellogg

(57) ABSTRACT

Personalization images are included in email messages to combat phishing attacks in which an attacker attempts to trick a user into divulging sensitive information over the Internet. When a recipient of an email message receives a message, the recipient can visually inspect the personalization image in the message. If the personalization image is missing or if the personalization image is not valid, the email recipient is alerted to the possibility of a phishing attack. Email message content may be encrypted. A gateway associated with an email message sender may be used to perform encryption operations on the message content. The gateway may create an html version of the email by placing the encrypted message content in an html wrapper. An image reference corresponding to the personalization image may be embedded in the html version of the message.

20 Claims, 20 Drawing Sheets

U.S. PATENT DOCUMENTS

| | | | | |
|---|---|---|---|---|
| 2005/0071632 | A1* | 3/2005 | Pauker et al. | 713/165 |
| 2005/0138353 | A1* | 6/2005 | Spies et al. | 713/153 |
| 2005/0144449 | A1* | 6/2005 | Voice | 713/169 |
| 2005/0228899 | A1* | 10/2005 | Wendkos et al. | 709/232 |
| 2006/0015722 | A1* | 1/2006 | Rowan et al. | 713/166 |
| 2006/0020812 | A1* | 1/2006 | Steinberg et al. | 713/181 |
| 2007/0066283 | A1* | 3/2007 | Haar et al. | 455/412.2 |
| 2008/0144837 | A1* | 6/2008 | McCullagh et al. | 380/281 |

OTHER PUBLICATIONS van der Merwe et al., Characteristics and responsibilities involved in a Phishing attack., Invited workshop on information technology and its applications: software development, disaster engineering, and security., Proceedings of the 4th international symposium on Information and communication technologies, Cape Town, South Africa., Jan. 2005.*

R. Dhamija et al. "The Battle Against Phishing: Dynamic Security Skins", Proceedings of the 2005 ACM Symposium on Usable Security and Privacy, Jul. 2005.

"Sign-in From New Device" [online]. Demonstration of Passmark Security, Inc. of Menlo Park, CA 94025, [retrieved on Sep. 26, 2005]: <URL: passmarksecurity.breezecentral.com/newdevice/>.

"Sign-in Demonstration" [online]. Demonstration of Passmark Security, Inc. of Menlo Park, CA 94025, [retrieved on Sep. 26, 2005]: <URL: passmarksecurity.breezecentral.com/signin/>.

"Registration Demonstration" [online]. Demonstration of Passmark Security, Inc. of Menlo Park, CA 94025, [retrieved on Sep. 26, 2005]: <URL: passmarksecurity.breezecentral.com/p70238971/>.

"Products and Services" [online]. Cyota, 2005 pp. 1-2, [retrieved on Sep. 26, 2005]: <URL: www.cyota.com/product_8.asp>.

"Cyota eStamp" [online]. Cyota, 2005 pp. 1-2, [retrieved on Sep. 26, 2005]: <URL: www.cyota.com/products-services.asp>.

"Key eStamp™ Benefits" [online]. Cyota, 2005 pp. 1-2, [retrieved on Sep. 26, 2005]: <URL: www.cyota.com/products_8_21.asp>.

"How does eStamp™ work?" [online]. Cyota, 2005 pp. 1-3. [retrieved on Sep. 26, 2005]: <URL: www.cyota.com/product_8_22.asp>.

* cited by examiner

SECURE MESSAGING SYSTEM WITH PERSONALIZATION INFORMATION

This application claims the benefit of provisional patent application No. 60/729,483, filed Oct. 21, 2005, which is hereby incorporated by reference herein in its entirety.

BACKGROUND OF THE INVENTION

This invention relates to messaging systems such as email systems, and more particularly, to secure email systems that use personalization information to counter phishing attacks.

The world wide web is often used for sensitive transactions such as those involved in online banking and e-commerce. In a typical scenario, a user obtains access to an account at a financial institution by supplying a valid username and password.

The popularity of online services has given rise to fraud. One type of fraud, known as "phishing," involves sending fraudulent email messages to recipients to entice them to reveal their username and password or other sensitive information to an unauthorized party.

Cryptographic systems such as secure email systems help prevent phishing attacks from succeeding, because recipients in secure email systems can verify the identities of message senders. In a secure email system, recipients use decryption software to decrypt incoming messages. However, in some environments, it may be difficult for a recipient to install the decryption software. For example, if a recipient works in a large organization, the organization's policies may prohibit the recipient from installing the decryption software.

Moreover, even when decryption software is used to decrypt incoming messages, it may be desirable to enhance the mechanisms available to recipients to identify the identities of message senders.

It would therefore be desirable to be able to better address the concerns posed by phishing attacks.

SUMMARY OF THE INVENTION

In accordance with the present invention, personalization information is included in communications between an organization and associated users. A sender associated with the organization may create message content. The sender sends the message content to a recipient in an email message. A gateway at the organization encrypts the message content and creates a corresponding html version of the email message. The html version of the email message includes the encrypted message content as an attachment. A personalization image is included in the html version of the email message by embedding an image reference.

The html email is sent over an unsecured Internet link to the recipient. The image reference is not encrypted and is therefore sent in the clear.

At the recipient, the email message is displayed by an email client. The personalization image is displayed for personnel at the recipient to visually inspect. The html email may contain instructions that direct the recipient to verify the authenticity of the personalization image before proceeding. The html email may also contain instructions regarding the decryption of the attached encrypted message content. If the personalization information passes visual verification, the recipient may follow the decryption instructions.

The encrypted message content may be decrypted remotely. The recipient opens the html email attachment following the decryption instructions. This operation launches a web browser at the recipient. By selecting an appropriate option such as a read message option, the web browser may be used to upload the encrypted message content from the attachment to a remote decryption server. The remote decryption server obtains credentials from the recipient and uses the credentials to obtain the recipient's private decryption key. The key is used to decrypt the encrypted message content. The decrypted version of the message content is provided to the recipient over a secure link. The personalization information may be included in the web pages that are presented by the web browser in connection with remote decryption operations.

In general, messages may be email messages, instant messages or any other suitable messages. Cryptographic systems based on public key and symmetric key encryption may be used. Secure communications may also be supported by using a server-based arrangement in which message content is stored on a server (with or without encryption) from which the recipient retrieves the content.

Personalization information is preferably specific enough to combat phishing attackers and does not include sensitive information which could be harmful to a user if divulged.

Further features of the invention, its nature and various advantages will be more apparent from the accompanying drawings and the following detailed description of the preferred embodiments.

DETAILED DESCRIPTION

Figure 1:
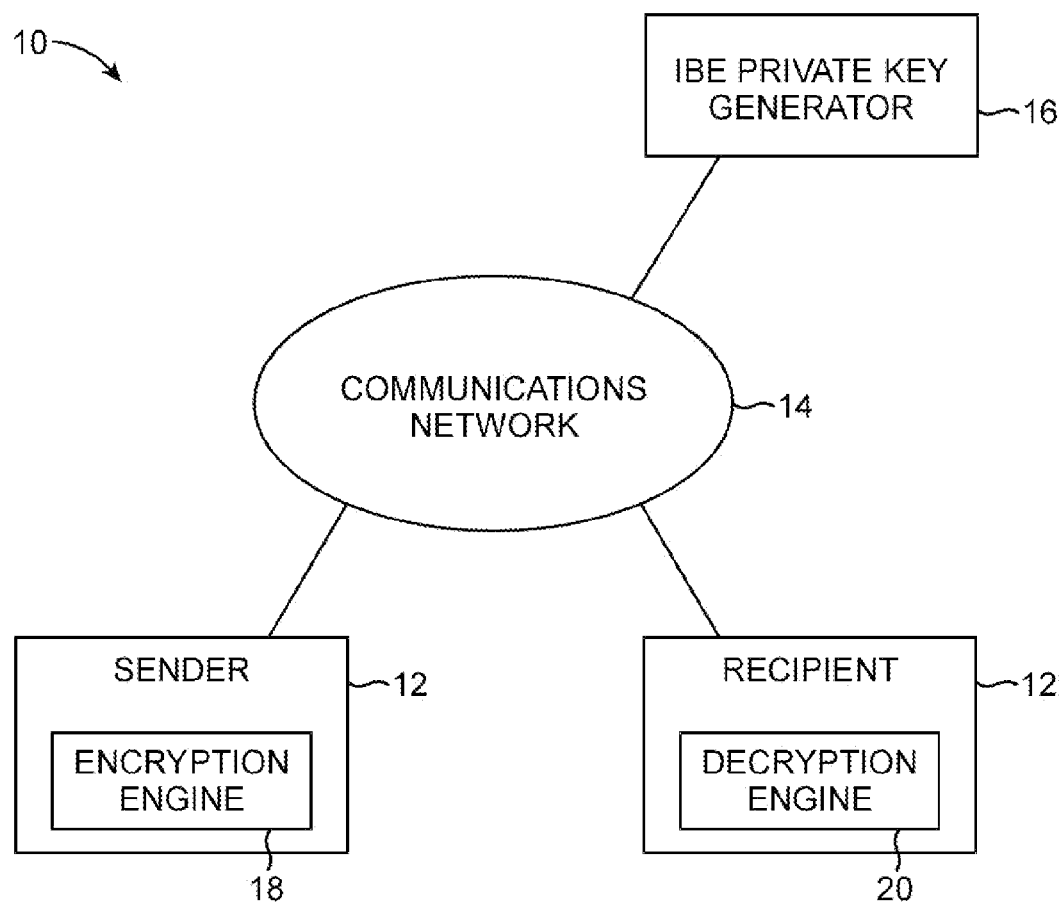
FIG. 1 is a diagram of an illustrative identity-based-encryption system in accordance with the present invention.

The present invention relates to secure communications. Secure communications systems such as secure email systems help to combat phishing attacks in which an attacker attempts to trick a user into divulging sensitive information.

Email used in phishing attacks is often in html format and contains graphics and text that makes recipients believe that the fraudulent email was sent by a legitimate institution. For example, a fraudulent email message may contain an accurate rendition of the logo of the recipient's bank.

The text of a fraudulent email may instruct the recipient to click on an embedded web link (URL). When the recipient clicks on the web link, the recipient's web browser presents the recipient with a fraudulent web page that appears to be associated with the recipient's institution. The fraudulent web page generally contains the institution's logo and other content that makes the web page difficult or impossible to distinguish from a legitimate web page associated with the institution. The fraudulent web page also contains text that prompts the recipient to log in to the institution by supplying appropriate credentials such as a username and password. When the recipient clicks on a login button on the fraudulent web page, the recipient's username and password are transmitted to the perpetrator of the fraud. The user credentials that have been fraudulently collected in this way may then be used to make unauthorized transactions at the recipient's institution.

Cryptographic systems can be used to help combat phishing attacks. For example, digital signatures may be used to ensure recipient of the identity of a message sender. Encrypted email messages are also safe from tampering, so recipients can rely on the contents of an encrypted email message from a trusted sender.

Secure email systems generally use encryption and decryption algorithms. Message content is encrypted at a message sender, so that it may be conveyed to a recipient over an insecure network.

A recipient of an encrypted email message must generally use decryption software to decrypt the message. However, in some environments it may be difficult or impossible to install such decryption software. For example, if a mail recipient is traveling and wishes to access their email through a public Internet terminal, it will not generally be possible for the recipient to download and install decryption software on the public terminal. In many business networks, system administrators place restrictions on which software can be downloaded and installed on the computers of the network. Users are often not permitted to install any software on their computers. Restrictions such as these have served to hinder the widespread use of encryption in email messaging.

In accordance with the present invention, recipients are provided with mechanisms to access the contents of encrypted email messages, even when they are not permitted to permanently install decryption software on their computers.

Messages can be delivered securely by providing recipients with access to stored messages over a secure link or by sending encrypted messages to the recipient for decryption. Recipients of encrypted messages may decrypt the messages by posting them to a remote decryption server or by using a so-called active content approach in which a Java script, ActiveX control, or other suitable applet performs decryption operations when launched by the recipient. For clarity, the invention is sometimes described in the context of remote decryption server arrangements. This is, however, merely illustrative. Any suitable arrangement may be used to decrypt message content when a recipient is sent an encrypted message.

A variety of cryptographic techniques may be used to encrypt email messages. With symmetric key cryptographic systems, the sender of a message uses the same key to encrypt the message that the recipient of the message uses to decrypt the message. In symmetric-key systems, senders and recipients exchange shared keys using a secure key exchange mechanism (e.g., over the telephone, by mail, by fax, over a secure Internet link, etc.).

With public-key cryptographic systems, two types of keys are used—public keys and private keys. Senders may encrypt messages using the public keys of the recipients. Each recipient has a private key that is used to decrypt the messages for that recipient.

One public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems such as the RSA system that use this type of traditional approach are referred to herein as PKI (public key infrastructure) cryptographic systems.

Identity-based-encryption (IBE) systems have also been proposed for use in secure messaging systems. As with PKI cryptographic systems, a sender in an IBE system may encrypt a message for a given recipient using the recipient's public key. The recipient may then decrypt the message using the recipient's corresponding private key. The recipient can obtain the private key from a private key generator associated with the recipient.

Unlike PKI schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

If desired, a message may be conveyed securely between a sender and recipient without encryption. With this type of approach, the message to be sent is stored on a server. After being notified, the recipient retrieves the message over the Internet using a secure link. The secure link may be, for example, a communications channel using the secure sockets layer (SSL) protocol.

In general, any of these techniques may be used for conveying a message securely between a sender and a recipient. The use of identity-based encryption (IBE) techniques to encrypt a message for a recipient is described as one example.

An illustrative identity-based-encryption (IBE) system 10 is shown in FIG. 1. A user may send a secure message to one or more other users over a communications network 14. The users in the systems described herein may be individuals, organizations, parts of organizations, or any other suitable parties or entities. Users who are sending messages are called senders. Users receiving messages are called recipients. The messages may include any digital information (e.g., text, graphics, audio, video, commands, executable code, data, etc.) that it is desired to convey electronically between senders and recipients in a secure manner.

Users may communicate with each other using equipment 12. Equipment 12 may, for example, include computing equipment such as a personal computers, portable computers, mainframe computers, networked computers or terminals, telecommunications equipment, handheld computers or personal digital assistants, or cellular telephones. Multiple individuals or organizations may use the same device. For example, a group of workers in an office may share the use of a single computer terminal that is connected to a host computer in a local area network. These are merely illustrative examples of the type of platforms that system 10 may use. Equipment 12 may be based on any suitable electronic equipment if desired.

The equipment of FIG. 1 may be interconnected by communications paths in a communications network 14. Network 14 may be, for example, the Internet, a local area network, a wide area network, the public switched telephone network, a virtual private network, a wired network, a wireless network, a network including dedicated leased lines, a network based on fiber-optic or cable paths or other wired or wireless paths, or a network formed using any other suitable network technology or a combination of such networks.

System 10 can have multiple IBE private key generators such as IBE private key generator 16 of FIG. 1. IBE private key generators generate IBE private keys to use in decrypting IBE-encrypted messages. IBE private key generators 16 may be maintained by any suitable entities. For example, an organization that desires to communicate using IBE-encrypted messages may maintain an IBE private key generator to use in supplying IBE private keys for message recipients. As another example, an IBE private key generation service may handle IBE private key requests for multiple organizations.

Various computing devices may be used with network 14 to support secure messaging features. The location of such computing equipment (i.e., whether the computing equipment is considered to be within or part of network 14 or is considered to be connected to network 14 from another location) is generally not critical. For example, computing equipment may be used to implement the functions of a server or other computer equipment at each IBE private key generator 16. Servers may also be used to support the functions of an IBE public parameter directory, an IBE public parameter host, a certificate authority, or other entities. Such servers may be co-located with a sender, may be connected to the network 14 as an independent third party service, may be part of the infrastructure of network 14, may be associated with a given recipient's organization, may be co-located with the recipient, private key generator, or other equipment, or may used at more than one of these locations. These are merely illustrative arrangements which need not be mutually exclusive.

A server may be formed using a single computer or multiple computers. Multiple servers may be implemented on one computer. If desired, the functions of a single server may be provided by computers that are distributed over a number of different physical locations. The functions implemented using servers in system 10 may generally be performed using other computer equipment configurations if desired, but the computing equipment for implementing these functions is generally referred to as a "server" or "servers" for clarity.

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or other electronic messages (e.g., messages sent between network equipment such as ICMP messages or messages sent between corporate IT systems, etc.) may be sent. Email messages may be used in contexts in which the widespread acceptance of the standard email format is important. Instant messages are generally limited in size, but may be delivered with less delay (e.g., less than a second) than email messages (which are typically delivered in less than one minute). Most instant messages are currently transported using insecure protocols.

The present invention is generally described in the context of email messages as an example. This is merely illustrative. Any suitable type of messages may be conveyed between senders and recipients if desired.

Some user activities in system 10, such as sending person-to-person email messages, involve at least some manual intervention. For example, a person who desires to send a personally-composed text message must type the message before it is encrypted and sent to the appropriate recipient.

Other user activities in system 10 may be entirely automated so that no human intervention is generally required. As one example, the user at one device 12 may be a banking institution that desires to use encrypted communications to deliver encrypted bank statements to account holders at other devices 12 over communications network 14. The statement preparation and distribution processes may be automated so that no operator intervention is generally needed at the banking institution's equipment once the system has been properly set up.

System functions involved in presenting on-screen options for humans to respond to (e.g., by clicking on them using a computer mouse) can be automated using software running on the components of the system. In general, automated system functions can be implemented using a manual arrangement and manual functions can be automated. The descriptions of particular functions as involving manual operations or computer-implemented operations in the following discussion are illustrative.

During certain operations of system 10, certain entities (e.g., private key generators such as private key generator 16) may need to verify that a given party has permission to access the contents of a particular message or to perform certain functions. In general, the entity performing such authentication and authorization processes may use any suitable manual or automatic techniques. For example, a user may provide credentials in the form of a pre-established user name and password. If desired, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. Hardware-based arrangements (e.g., based on hardware tokens) may be used to establish identity. Certificate authorities may create digital certificates that help to verify the identities of certain parties. Digital signatures (e.g., signatures from a certificate authority or other entity that use PKI private keys and that can be verified using matching PKI public keys) may be used to ensure that a message or other signed information is associated with a particular party.

Sometimes authentication information and other information (in addition to the messages being sent from the senders to the recipients in system 10) such as IBE public and private keys must be conveyed between parties securely (e.g., between a sender and a private key generator or between a recipient and a private key generator, etc.). A number of different approaches may be used to convey information over a network such as network 14 securely. For example, information may be conveyed securely over a secure communications path such as a communication path that uses the secure sockets layer protocol (SSL) or other suitable secure protocol (e.g., TLS), a communications path may be trusted because it is under the control of a trusted party (e.g., the communications path may be physically under the control of a trusted party), and information may be conveyed securely by encrypting the information (e.g., in a message) before sending it over an insecure (or secure) link.

The operation of system 10 may involve the use of traditional public-key encryption cryptographic techniques such as used with RSA public-key cryptography. For example, the secure sockets layer protocol, which may be used to secure communications between parties when a web browser or other application is used, involves the use of certificates from trusted certificate authorities. Digital signatures can also be implemented using traditional public-key encryption techniques. These traditional public key cryptographic techniques are referred to herein as "PKI" cryptographic techniques.

The operation of system 10 also uses identity-based encryption (IBE) cryptographic techniques. These cryptographic techniques are referred to herein as "IBE" cryptographic techniques.

PKI and IBE encryption schemes use an asymmetric approach. Some information (so-called public key information) is used to encrypt messages. Other corresponding information (so-called private key information) is used to decrypt the encrypted message.

IBE encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001. See also http://eprint.iacr.org/2001/090 by Dan Boneh and Matthew Franklin). With the approach described in the work of Boneh and Franklin, IBE encryption is based on the properties of bilinear maps such as a Weil Pairing or Tate Paring. For clarity, aspects of the present invention will sometimes be described in the context of an identity-based encryption scheme such as the elliptic curve implementation described by Boneh and Franklin. This is, however, merely illustrative. Any suitable approach for IBE encryption may be used with system 10 if desired.

Initially, when the system is set up, an IBE private key generator (e.g., IBE private key generator 16 of FIG. 1) obtains or generates a master secret s. For example, the private key generator may create a master secret from a number that is randomly generated at the private key generator by a processor housed inside a tamper-proof enclosure. The master secret may also be produced off-site and delivered to the private key generator 16. The master secret (also sometimes referred to as a secret master key or a master key) is secret information that will subsequently be used by the private key generator 16 to generate private keys for recipients in the system to use in decrypting messages and to generate public parameter information for use by senders in encrypting messages.

After the master secret s has been obtained, the private key generator may generate the public parameter information. In the identity-based encryption approach of the above-mentioned work of Boneh et al., the public parameter information that is generated includes public parameters P and sP.

After the public parameter information (e.g., P and sP) has been determined, the IBE private key generator 16 may make this information available to senders in system 10. The public parameter information may be provided to the senders using any suitable technique. For example, recipients may send the public parameter information to senders in email messages. If desired, the private key generator 16 may publish the public parameter information using a directory service or by placing the public parameter information on a particular host server that a sender can reach using an associated domain name or other suitable service name based on the recipient's public key. These are merely illustrative techniques for making the public parameter information available to users in system 10. Any suitable technique for making the public parameter information available to the users may be used if desired.

Once the public parameter information (e.g., public parameters P and sP) has been provided to a user (i.e., a sender) who desires to send an encrypted message to another user (i.e., a recipient), the sender may encrypt and send the message to the recipient. An IBE encryption engine 18 implemented on the sender's equipment may be used to encrypt the message. The IBE encryption engine 18 may use the public parameter information (e.g., P and sP) and the IBE public key associated with the recipient to perform message encryption.

The way in which the received message is decrypted depends on the type of decryption arrangement that is being used. In general, some recipients will be able to install their own software, whereas other recipients will be working at organizations which restrict new software installations. Recipients who are able to install software on their equipment can install a decryption engine 20 that performs IBE decryption, as shown in the example of FIG. 1. When a recipient of this type receives the IBE-encrypted message, or earlier, when the recipient sets up or updates the equipment at the recipient's location, the recipient obtains the recipient's IBE private key from the IBE private key generator 16 to use in decrypting the message. The recipient (in this example) may use the IBE decryption engine 20 implemented on the recipient's equipment to decrypt the message. The IBE encryption engine 18 and decryption engine 20 may use software to implement the desired IBE encryption and decryption algorithms. Engines 18 and 20 may be provided to users in the system as part of the users' initially-loaded messaging software, as a downloadable program or plug-in, or using any other suitable technique.

Identity-based encryption (IBE) is so named because the encryption process at the sender uses an IBE public key Q that is generally based on the recipient's identity. The identity of a user in an IBE encryption scheme may be represented by any suitable string, number, or symbol. For example, the identity of a message recipient may be represented by that recipient's email address, name, or social security number. An advantage of IBE schemes is that a sender can generally determine the identity (e.g., the email address) of an intended recipient without all of the complexities involved in obtaining the PKI-public key of the intended recipient as would be required with traditional PKI schemes such as the RSA cryptographic scheme. For example, the IBE public keys may be the same as (or based on) user email addresses, which are readily obtainable.

The IBE private key generator 16 may generate IBE private keys for each of the multiple users associated with that IBE private key generator (message recipients) based on the IBE public keys (the Q's) of each of these users (e.g., based on the users' identities).

The form of IBE public key Q that is used for a given IBE scheme depends on the security features that are desired. For example, user privileges may be made to automatically expire by automatically concatenating a validity period (e.g., a date or date range such as the current day of the year and year, the current month, starting and ending dates such as Jan. 2, 2003-Jan. 10, 2003, or any other suitable time-related date-stamp information) with each user's email address to form Q values based not only on the users' identities (i.e., email addresses) but also validity period information. The validity period acts as an access policy for the encrypted message that is more generally applicable than the user-specific email address identity information.

A sender desiring to send an IBE-encrypted message should have information sufficient to construct the IBE public key Q of the intended message recipient such as the recipient's identity (e.g., email address). The sender must also obtain the public parameter information (e.g., P and sP) associated with the intended recipient of the message prior to message transmission.

Once the sender has the IBE public key of the recipient and the appropriate corresponding public parameter information, the sender may use the IBE encryption process (e.g., the process of the work of Boneh and Franklin described above) to encrypt the message contents for the recipient. The IBE process may be implemented using software at the sender's equipment such as IBE encryption engine 18. The encryption engine 18 may be a stand-alone process or application or may be incorporated into another process or application. If desired, such a process or application (whether stand-alone or multi-function) may be referred to as a user's "client" software or "client." The IBE encryption engine 18 may take as inputs (1) the message to be encrypted, (2) the IBE public parameter information (e.g., P and sP), and (3) the IBE public key Q. The IBE process implemented using the IBE encryption engine 18 produces an encrypted version of the message as its output.

The sender may transmit the encrypted message to the recipient using an email program or other suitable software. In organizations that contain gateway servers, a user may transmit the message in unencrypted form. The gateway may intercept the message and perform encryption operations before sending the message in encrypted form to the recipient. After the IBE-encrypted message has been transmitted to the recipient over communications network 14, the recipient may receive the message. The contents of the encrypted message may be accessed by decrypting the encrypted message using an appropriate IBE private key. A recipient having a locally-installed decryption engine 20 such as the recipient of FIG. 1 may use decryption engine 20 to decrypt the message. Recipients without access to locally-installed decryption engines 20 can use a remote decryption engine for decryption.

The IBE private key that is used for decrypting the message is related to the IBE public key Q and public parameter information (e.g., P and sP) used when encrypting the message. Only the IBE private key that matches the IBE public key that was used to encrypt the message may be used to decrypt the message. Generation of the IBE private key requires knowledge of the master secret s, so only the appropriate private key generator 16 can generate the recipient's IBE private key based on the recipient's IBE public key Q.

With one suitable approach, the IBE private key for the recipient may be generated from the recipient's IBE public key Q and the master secret s by using an appropriate mathematical function (e.g., the multiplication of integers with points on elliptic curves) to calculate the value of sQ.

The recipient's authorization to access the contents of the message may be verified using authentication information (credentials) from the recipient and using other information (e.g., independently-gathered information on the current date). The private key generator 16 may use this information to determine whether a given recipient is authorized. Once the IBE private key generator 16 verifies that the recipient is authorized to access the message contents, the private key may be issued to the recipient or to a remote decryption server that is performing decryption operation on behalf of the recipient by the IBE private key generator 16. In general, any suitable number of intermediate parties or agents may be used during the operations involved in gathering and authenticating recipient credentials and producing and using a recipient's IBE private key. Moreover, any suitable manual or automatic authentication technique may be used by the IBE private key generator 16 to verify that the recipient or the recipient's agent is authorized to receive the IBE private key prior to issuing the key to the recipient.

Regardless of how the IBE private key generator 16 determines that the recipient is authorized to obtain the IBE private key, the private key should be provided to the decryption engine 20 for use in decrypting the message. Any suitable technique may be used to provide the IBE private key to the decryption engine 20. For example, IBE private key may be provided over a secure communications channel between the IBE private key generator and the equipment on which the decryption engine 20 is installed.

If desired, IBE private keys may be stored by the decryption engine 20 (e.g., in a database on a storage device such as a memory circuit or hard drive on the recipient's equipment). If the private key is stored locally and has not expired or otherwise become obsolete, the decryption engine 20 can retrieve it the next time a message needs to be decrypted without needing to contact the IBE private key generator 16 to obtain a new copy of the IBE private key over the communications network. The sender may cache public parameter information on the sender's equipment in a similar fashion to facilitate retrieval of the public parameter information when it is desired to send an encrypted message.

Figure 2:
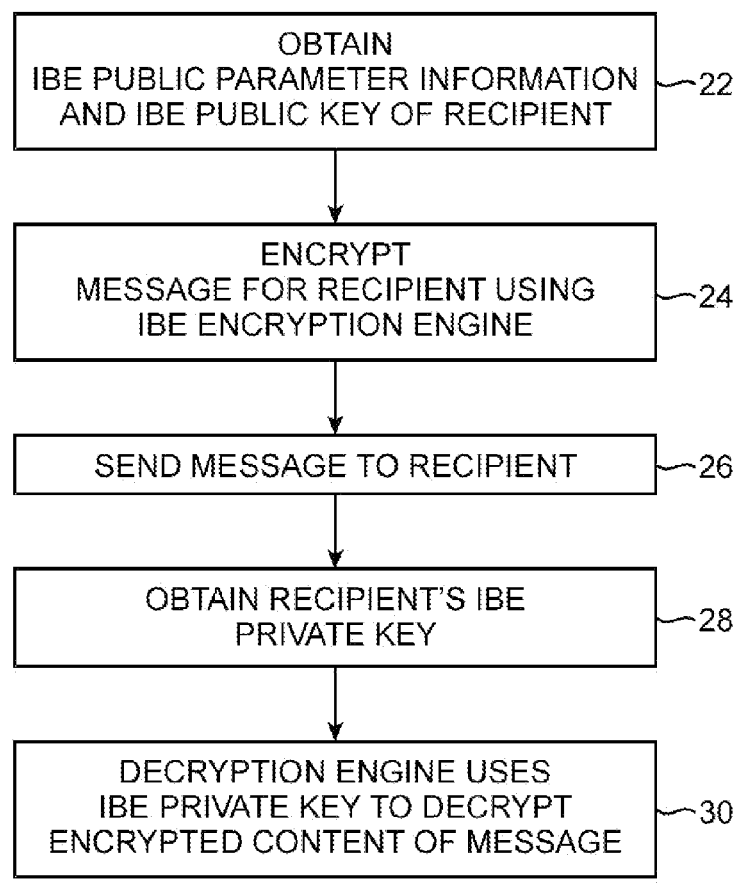
FIG. 2 is a flow chart of illustrative steps involved in using identity-based-encryption techniques to support secure messaging in accordance with the present invention.

Illustrative steps involved in using IBE-encryption to convey a secure message from a sender to a recipient are shown in FIG. 2. At step 22, the encryption engine 18 that is associated with the sender obtains the IBE public key Q of the intended recipient and the associated IBE public parameter information (e.g., parameters P and sP). The IBE public key Q may be obtained from a source that has a copy of the appropriate IBE public key Q or may be generated based on known rules (e.g., by obtaining the recipient's email address or other identity information, by determining a suitable validity period or other information to be combined with the recipient's identity, and by using this information to generate Q). The IBE public parameter information may be obtained from the recipient or other suitable party, may be obtained over network 14 from a directory service (e.g., a directory service implemented on a server connected to network 14), or may be obtained over network 14 from a host associated with the IBE private key generator 16 that generated the public parameter information. The IBE public key Q and IBE public parameter information may be cached locally for later retrieval if desired.

At step 24, the IBE encryption engine 18 (e.g., the encryption engine 18 of FIG. 1) encrypts the message for the recipient.

The IBE-encrypted message may be sent to the recipient and received by the recipient over network 14 at step 26. The message may be accompanied by information on the IBE public key Q that was used to encrypt the message. This information may be used by in determining which private key generator 16 to contact at step 28 to obtain the IBE private key needed to decrypt the message.

To obtain the IBE private key from the private key generator at step 28, the decryption engine (e.g., the decryption engine 20 of FIG. 1) or a suitable agent such as a gateway server may provide information on Q (e.g., Q, a precursor of Q, or a derivative of Q) to the private key generator that the private key generator can use to determine which private key is being requested (and which access policies apply). The decryption engine 20 or agent can provide the private key generator with recipient credentials such as username and password information, biometric information, age information, and other suitable identity and authentication information gathered from the recipient that the private key generator 16 may use to verify that the recipient is authorized to obtain the requested IBE private key.

If desired, certain access policies may be implicit. Moreover, the private key generator may use its own information (e.g., information on the current time and date) as well as recipient credentials in determining whether or not a given recipient is authorized to obtain the IBE private key. During the authentication process, the recipient and the IBE private key generator and their agents may communicate using secure communications (e.g., using PKI-encrypted messages, a trusted communications path, a secure communications link such as an SSL or TLS link, etc.).

When the private key generator 16 determines that the recipient is authorized to obtain a copy of the IBE private key, the private key may be provided to the decryption engine 20 securely at step 28 (e.g., in a secure message or over a secure communications link in network 14).

At step 30, after the decryption engine 20 has obtained the appropriate IBE private key, the decryption engine 20 uses the IBE private key to decrypt the encrypted message. When the decryption engine 20 is implemented locally on the recipient's equipment as shown in FIG. 1, the decrypted message contents may be displayed for the recipient using an email client or other suitable software running on the recipient's equipment. When the decryption engine 20 is implemented remotely, the decrypted content may be conveyed to the recipient over a secure link (e.g., an SSL link). In a typical remote decryption scenario, the recipient views decrypted message contents using commonly available software such as a web browser running on the recipient's equipment.

Recipients who have locally-installed decryption engines 20 can be automatically presented with decrypted content. When an encrypted message is received, the IBE decryption process is automatically invoked and the results of the decryption operations are presented to the recipient.

Recipients without locally-installed decryption engines are first notified that a secure message is available. These recipients then use locally available software such as their email program (email client) and web browser to access the secure message contents. With one suitable approach, IBE-encrypted message contents are sent to the recipient in an email message that contains instructions for the recipient on how to remotely decrypt the message. The instructions may, as an example, direct the recipient to open an email attachment to initiate the remote decryption process. The recipient provides credentials and, following successful remote decryption operations, receives access to the unencrypted version of the message contents.

Because messages of this type contain information that informs the recipient of the nature of the encrypted message and the procedures involved in obtaining access to the message contents, these messages are sometimes referred to as notification messages. Although notification messages may be sent that include only text, there are benefits to providing notification messages in html (hypertext markup language) format. For example, html messages can contain graphics and interactive links. A notification message may, as an example, contain a logo associated with the organization responsible for the secure email service, which helps the recipient identify the nature of the message and feel comfortable following the decryption instructions.

Particularly in situations in which notification messages contain graphics and are in html format, recipients may be subject to phishing attacks in which an attacker creates fraudulent notification messages. The fraudulent messages may contain logos and other graphics that make the messages appear to be legitimate.

In accordance with the present invention, messages that are displayed for a user such as email messages or notification messages and related web pages can be labeled with personalization information. The personalization information may be, for example, a personalization image. Phishing attackers are not able to economically forge messages that contain appropriate personalization images, so the presence of the personalization image in the notification message assures the recipient that the message is authentic. If the personalization image is not contained in a message, the recipient will be warned by its absence.

Personalization images may be presented to users that have locally installed decryption engines and to users that do not have locally installed decryption engines. Users with locally installed decryption engines may be presented with a personalization image by their messaging client. Users without locally installed decryption engines may be presented with a personalization image using their web browser and using their messaging client.

Figure 3:
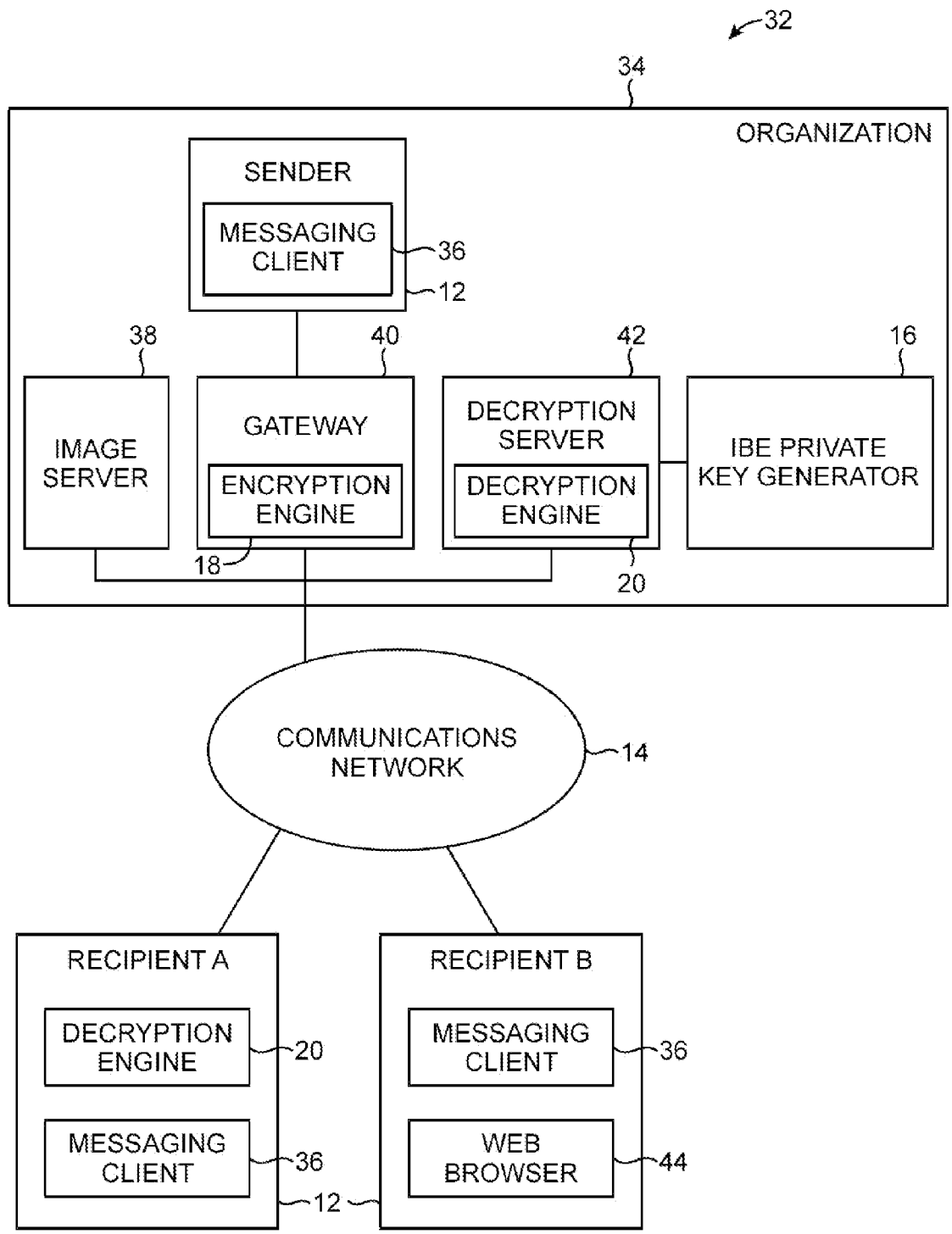
FIG. 3 is a diagram of an illustrative system that supports secure messaging schemes using personalization information in accordance with the present invention.

An illustrative secure messaging system of the type that may include personalization images or other personalization information to thwart phishing attacks is shown in FIG. 3. The system of FIG. 3 represents an example of a system that uses identity-based encryption to encrypt and decrypt messages. This is merely illustrative. In general, any suitable systems that convey messages to recipients can use embedded personalization information to combat phishing attacks. The arrangement of FIG. 3 is described as an example.

System 32 of FIG. 3 includes one or more organizations such as organization 34. A sender 12 at organization 34 may send secure messages to recipients 12 such as recipient A and recipient B.

Some recipients such as recipient A have a decryption engine 20 installed on their equipment. Such recipients can receive and decrypt IBE-encrypted messages. In a typical scenario, recipient A receives an encrypted email message using an email client 36. Decryption engine 20 is installed on the equipment of recipient A as a plug-in that works with client 36. When the encrypted email is received, the email client 36 automatically decrypts the encrypted email and presents its contents to recipient A using a cached copy of recipient A's IBE private key. If a fresh copy of recipient A's private key is required, it can be obtained from an appropriate IBE private key generator 16 over network 14. If a personalization image is included in the message, the email client 36 may present the personalization image to the user.

Other recipients, such as recipient B do not have a decryption engine installed on their equipment. Such recipients may, as an example, work at an organization that restricts software installations or may be working from a remote terminal such as a public Internet terminal that does not allow software to be installed. These recipients may have software such as messaging client 36 (e.g., an email client) and a web browser 44, but do not have a locally-installed copy of a decryption engine 20. Accordingly, when a recipient such as recipient B receives an encrypted message, the encrypted message is decrypted at a remote location. In general, any remote decryption location may be used. In the example of FIG. 3, encrypted messages are decrypted by a decryption server 42 that is associated with the sender's organization 34. Decryption server 42 has an IBE decryption engine 20 that is used to decrypt IBE-encrypted messages for recipients that do not have local decryption capabilities.

Decryption server 42 obtains IBE private keys for decryption from IBE private key generator 16. In the example of FIG. 3, the IBE private key generator 16 is maintained by the organization 34 associated with the sender of the encrypted message. If desired, IBE private key generator 16 may be operated at a remote location (e.g., by a third party).

Sender 12 may be an individual or a machine that generates messages automatically. As an example, organization 34 may be a bank that desires to send encrypted messages to its customers. In this type of scenario, sender 12 includes computing equipment that automatically generates messages, generally without manual intervention.

Various architectures may be used by an organization that desires to send messages automatically. In the illustrative example of FIG. 3, senders are connected to a gateway server 40 through network connections associated with the organization. Gateway server 40 serves as an email gateway and intercepts and processes outgoing email messages. Because the senders and gateway 40 are part of the same organization, the network connections that are used to link these entities are generally secure. Accordingly, it is typically not necessary to encrypt communications between individual senders and their associated gateway 40. Messages are sent from senders in unencrypted form and are intercepted and encrypted by gateway 40 using its associated IBE encryption engine 18.

Gateway 40 also preferably includes personalization information with outgoing messages. Personalization information may include user-selected or automatically-generated items of information such as nicknames, part of a user's social security number, partial credit card numbers, full user names or middle names, code words, memorable phrases, or other text strings, visual information such as graphics (e.g., favorite colors, memorable shapes or color schemes, patterns, video clips or animations, etc.), images (e.g., graphics-based images of objects or abstract patterns, pictures of people, pictures of common objects, pictures of places, etc.), audio information (e.g., a sound clip, a set of tones, a voice clip, a song clip, etc.), or any other suitable combination of visual and audio elements that can be used to personalize a message.

With one suitable arrangement, the personalization information is an image. Personalization images are stored on image server 38. When an email is sent from a sender to a recipient, the gateway 40 intercepts the email and encrypts its contents. The gateway also incorporates an appropriate personalization image into the message. When a recipient such as recipient B who does not have a decryption engine 18 receives the message from the gateway, the presence of the personalization image informs the recipient that the message has not been forged by a phishing attacker.

The personalization image may be included in the email using any suitable technique. With one suitable technique, the gateway 40 uses an html format to send encrypted email to recipients and includes unencrypted personalization images in the email using html image references. The image data for each personalization image is stored on image server 38. When a recipient receives an email from gateway 40, the recipient's email client 36 processes the html in the email and renders a corresponding display screen for the recipient. Logos and other html graphical elements are displayed as graphics. The image reference is sent to image server 38 over network 14 by the email client. In response, the image server 38 returns the image data corresponding to the image reference. The email client displays the image data (i.e., the personalization image) for the recipient along with the logos and other html graphical information in the message. Because the image reference is not encrypted, the personalization image may be displayed without using a decryption engine at the recipient.

The gateway 40 generates image references for recipients using each recipient's email address. It is not necessary for a distinct image to be used for each of the recipients in system 32. What is required is that the number of images be large enough to render phishing attacks based on image interception uneconomical for an attacker.

A typical phishing attacker harvests email addresses from the Internet. Email addresses are often contained on web sites, so attackers can harvest large numbers of email addresses at relatively low cost. Attackers use the harvested email addresses in launching phishing attacks. To make these attacks uneconomical, it is not necessary to make each personalization image unique. Significant economic hardships can be imposed on phishing attackers using relatively small numbers of images.

For example, using one thousand personalization images in a system will make it one thousand times less economical for a phishing attacker to mount an attack. The personalization image references are sent in the clear over network 14 (e.g., the Internet), as they are not encrypted and are not sent over secure links. As a result, a committed attacker could obtain the personalization image associated with any given recipient and could then mount a phishing attack against that recipient.

However, phishing attacks are characterized by mass mailings of millions of identical fraudulent email messages and are impractical if the fraudulent emails must each be personalized. When a thousand different personalization images are used in a system, a phishing attacker could attach a given one of the personalization images to all of the fraudulent emails in the mass mailing in the hopes of tricking those recipients having that personalization image, but because there are a thousand different personalization images (in this example), the expected success rate of the phishing attacker is reduced by a factor of one thousand. If larger numbers of personalization images are used (e.g., one hundred thousand), the return rate of the phishing attacker becomes negligible. However, even the use of a relatively small number of personalization images (e.g., tens, hundreds, or thousands) can form a significant economic impediment to successful phishing attacks.

To prevent a phishing attacker from systematically generating correct personalization image references for incorporation into fraudulent emails, the image references may be generated by gateway 40 using a mathematical operation that cannot be copied by an attacker. With one suitable arrangement, the gateway may produce the image reference by applying a one-way function such a hash function to the recipient email address concatenated with a secret K. The result of this operation can be used as part of the image reference.

The secret K may be, for example, a number. The secret K is preferably shared between the gateway 40 and the image server 38, so both the gateway and image server are able to construct image references from recipients' email addresses. Gateway 40 may use the hash function to construct image references that are incorporated into outgoing html email messages. Image server 38 may use the hash function to verify that a received image reference is legitimate. If a received image reference is not valid, the image server 38 can generate a warning or take other appropriate action. If a received image reference is valid, the image server 38 can provide the personalization image corresponding to the image reference to the recipient over the Internet for display to the recipient in the recipient's email client or web browser.

Recipients such as recipient B can access the contents of IBE encrypted messages using a web browser 44 (e.g., in a web-mail scenario) or using an html-enabled email client 36 and a web browser 44. The use of an email client 36 and web browser 44 to access IBE encrypted messages is described as an example.

Initially, a sender generates an email message that is addressed to a desired recipient and provides the message to gateway 40. Gateway 40 may be, as an example, a mail server that is connected to a sender's computer over a local area network at the organization 34. The gateway 40 encrypts the contents of the sender's message using IBE encryption engine 18 and creates an html version of the message by placing the encrypted message contents in an html wrapper (also sometimes referred to as an overlay). The gateway uses the recipient's email address and the secret K to generate the image reference. The image reference is incorporated into the html version of the message. The gateway also includes instructions for the recipient in the html message. The gateway then sends the html version of the message to the recipient.

Figure 4:
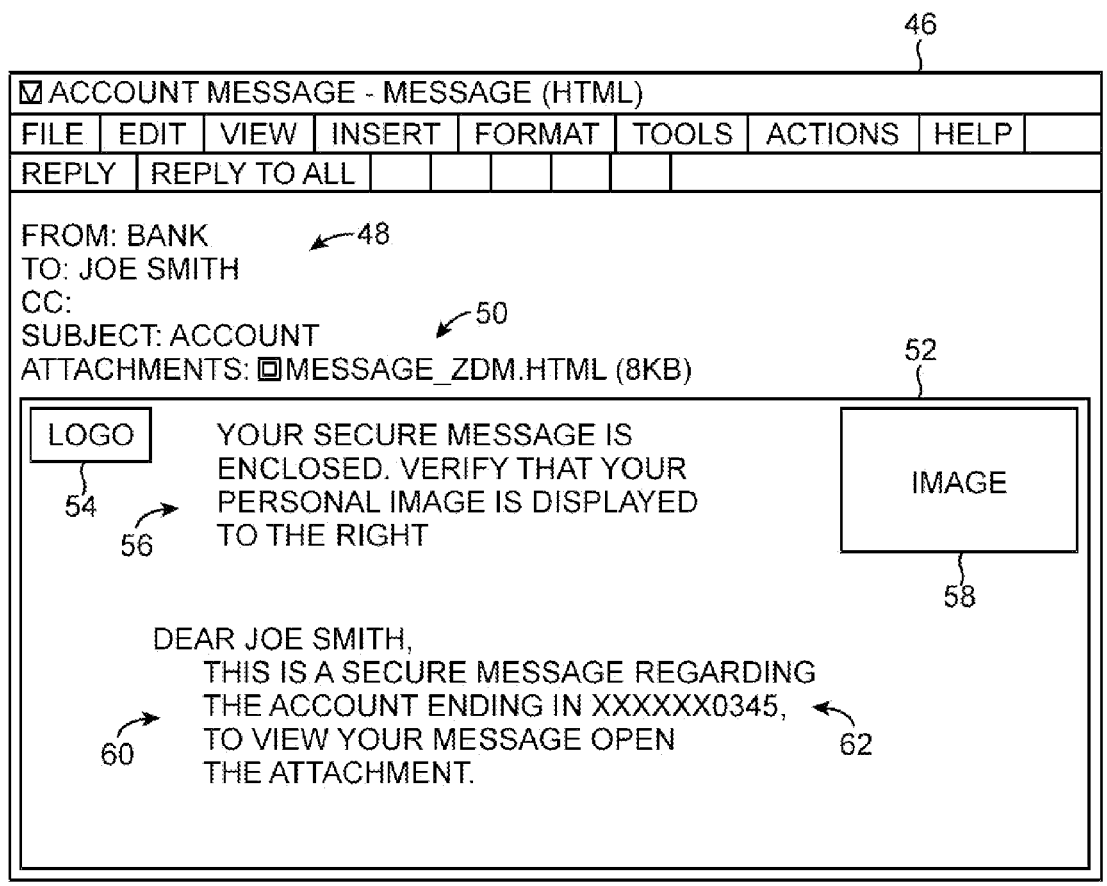
FIG. 4 is a diagram of an illustrative notification arrangement that may be used to present a recipient with an encrypted message in accordance with the present invention.

At the recipient, the message is received and displayed on the recipient's monitor using email client 36. A typical message that is displayed may appear as shown in FIG. 4. As shown in the example of FIG. 4, the email message 46 contains header information 48 such as to and from addresses, subject information, and attachments. In this example, the encrypted message contents is included in the message 46 in the form of an attachment 50. Messages such as message 46 notify the recipient that an email message is available (by opening the attachment) and are therefore sometimes referred to as notification messages.

Display region 52 contains html graphics. In the example of FIG. 4, a logo 54 such as the logo of the sending organization or an organization associated with the IBE encryption techniques that are being used is included in region 52. Region 52 may also be used to display the personalization image 58 that corresponds to the image reference created by the gateway. The image 58 is displayed visually for the recipient by the email client 36.

Region 52 preferably contains instructions 56 that direct the recipient to check the validity of the image reference 58. The recipient reading these instructions is reminded that the personalization image 58 that is displayed should look familiar. If no image is displayed to the right of instructions 56 or if the displayed image does not match the recipient's personalization image, the recipient can take appropriate action. For example, the recipient can delete message 46 without opening attachment 50 and can notify an appropriate administrator.

The region 52 in the notification message preferably includes instructions 60 that inform the recipient of which actions are necessary to access the contents of the message (i.e., to view the unencrypted version of the contents of the message attachment 50). Because of the caution in instructions 56 and because the recipient has preferably been conditioned to inspect incoming encrypted emails for the presence of image 58, fraudulent email messages that contain instructions 60 but do not contain a valid personalization image will be discarded or ignored by the recipient, thereby preventing successful phishing attacks.

The personalization information that has been incorporated into the email message 46 of FIG. 4 is a personalization image 58. In the example of FIG. 4, instructions 60 also contain the last four digits 62 of the recipient's financial account ("0345"). These four digits 62 serve as a form of personalization information and supplement the personalization information 58. In general, it is not desirable to require recipients to divulge personalization information that is too sensitive. For example, using an individual's full credit card number and expiration date as the personalization information would be counterproductive, because sending this type of sensitive information in the clear over the Internet is a security risk. Preferably, the personalization information is sufficiently unique for a person to be able to immediately recognize whether the personalization information is valid. Personalization information based on images can be beneficial in this way, because people tend to be able to easily discriminate between different visual patterns.

When the recipient has successfully verified that the personalization image 58 (and any other personalization information included in the email) is valid, the recipient follows the instructions 60. In this example, the instructions 60 direct the recipient to open the attachment 50.

Figure 5:
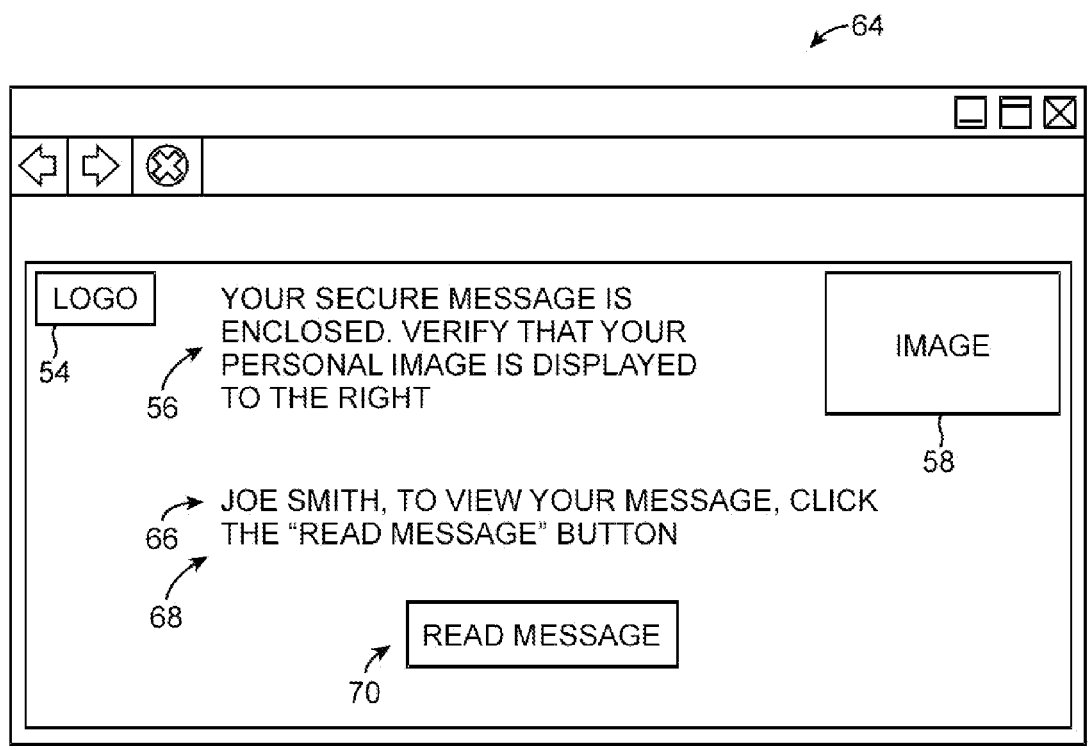
FIG. 5 is a diagram showing an illustrative web page that may be displayed for a recipient when the recipient opens an email attachment accompanying a message of the type shown in FIG. 4 in accordance with the present invention.

The recipient opens the attachment 50 by double-clicking on the attachment icon. In response, the web browser 44 is launched and a web page such as page 64 of FIG. 5 is displayed. As shown in FIG. 5, the page 64 may include logo 54 (e.g., the same logo displayed in FIG. 4). The page 64 may also include the same personalization image 58 and the same instructions 56 that were displayed in the notification message of FIG. 4. Displaying the logo 54, instructions 56, and image 58 helps to assure the recipient that the recipient has not been taken to a fraudulent web site. The web page 64 may also contain information 66 such as the recipient's name and instructions 68 that inform the recipient of additional actions required to access the message contents. Web page 64 includes an interactive read message option 70 in the form of a clickable button. After the recipient has inspected the personalization image 58 to verify that it is authentic, the recipient can follow the instructions 68 by clicking the read message button 70.

Figure 6:
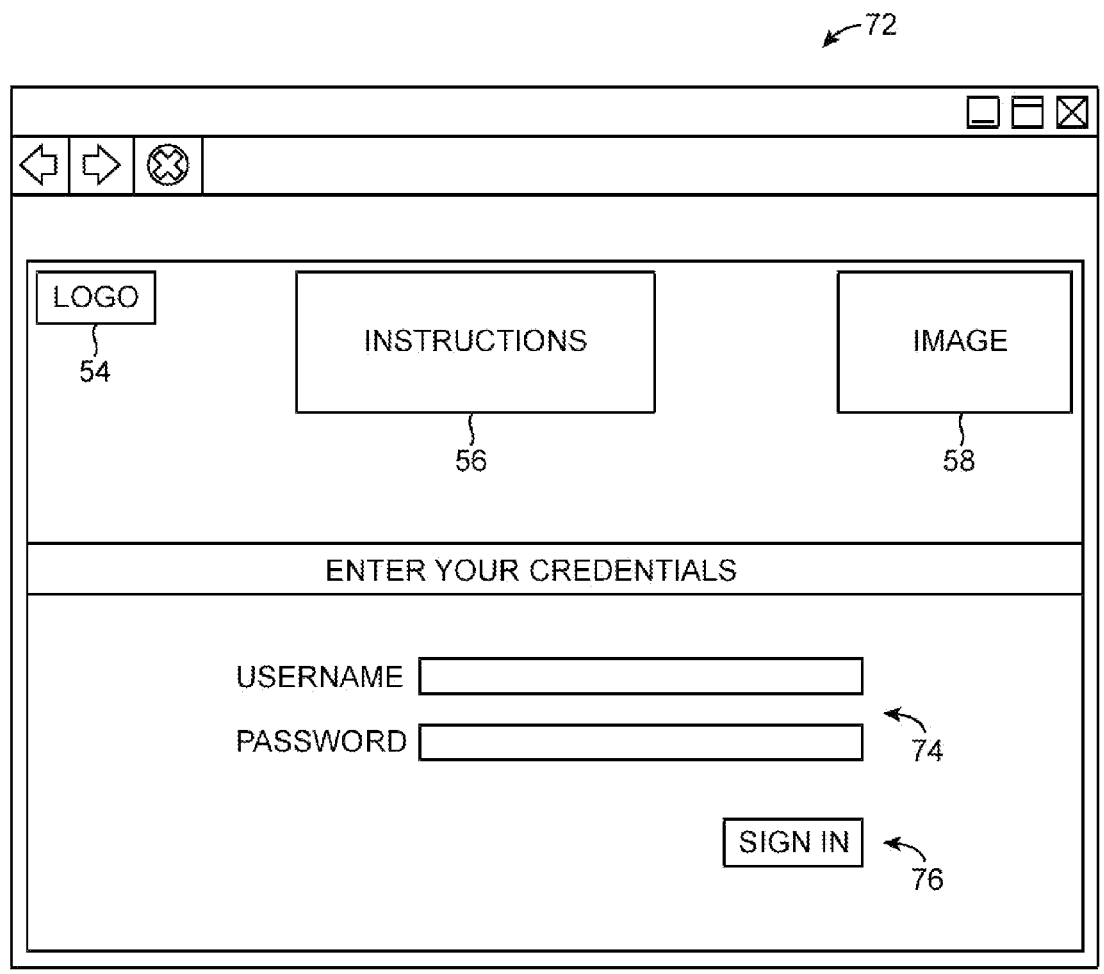
FIG. 6 is a diagram showing an illustrative user authentication web page that may be displayed for a recipient when the recipient clicks on a read message button on a web page of the type shown in FIG. 5 in accordance with the present invention.

Clicking on the read message button 70 in page 64 causes the web browser 44 to send the IBE-encrypted message to the decryption server 42 (FIG. 3). Decryption server 42 receives the IBE-encrypted message and authenticates the recipient. For example, the decryption server 42 may present the recipient with a web page such as the authentication web page 72 of FIG. 6. Web page 72 may contain the same logo 54 that was displayed in page 64. Web page 72 may also include the same (or similar) instructions 56 and the same personalization image 58 as those displayed in web page 64. After the recipient has followed the instructions 56 by verifying that the personalization image 58 is correct, the recipient may provide the decryption server 42 with appropriate credentials. With one suitable arrangement, web page 72 is provided over an SSL link and region 74 uses a web form arrangement to collect username and password credentials provided by the recipient when the recipient clicks on sign in button 76.

The decryption server 42 (FIG. 3) receives the recipients credentials and authenticates the recipient. With one suitable arrangement, the decryption server 42 uses a secure link to provide the recipient's credentials to the IBE private key generator 16, which authenticates the recipient and provides the decryption server 42 with the recipient's IBE private key. With another suitable arrangement, the decryption server 42 consults a database of recipient credentials and stored IBE private keys.

Figure 7:
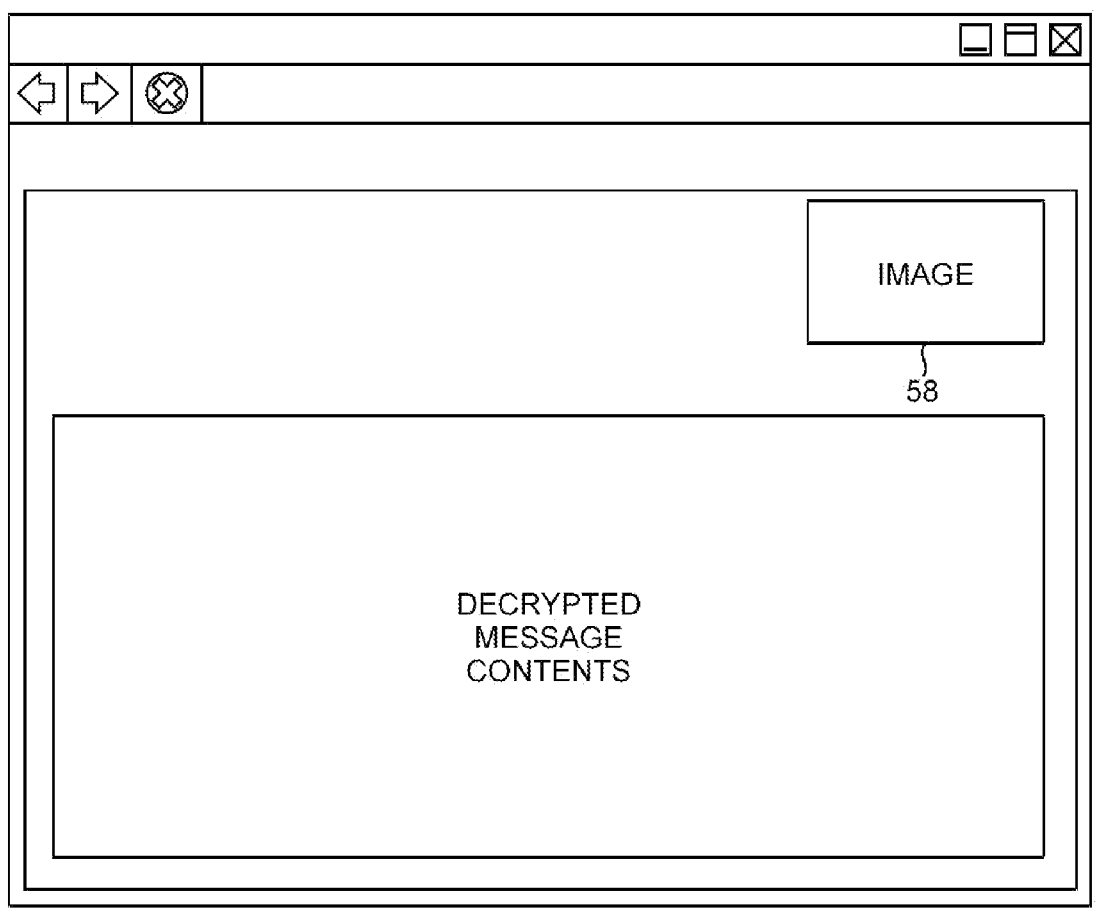
FIG. 7 is a diagram showing an illustrative web page in which a decrypted message is displayed after the recipient has been authenticated using a web page of the type shown in FIG. 6 in accordance with the present invention.

The IBE private key of the recipient is used in decryption engine 20 to decrypt the contents of the encrypted message that was provided to the decryption server from the recipient. The resulting decrypted message contents are returned to the recipient over the SSL link between the decryption server 42 and the recipient. At the recipient, the web browser 44 displays the decrypted message contents for the recipient in a web page such as web page 78 of FIG. 7. If desired, personalization image 58 may be displayed.

Figure 8:
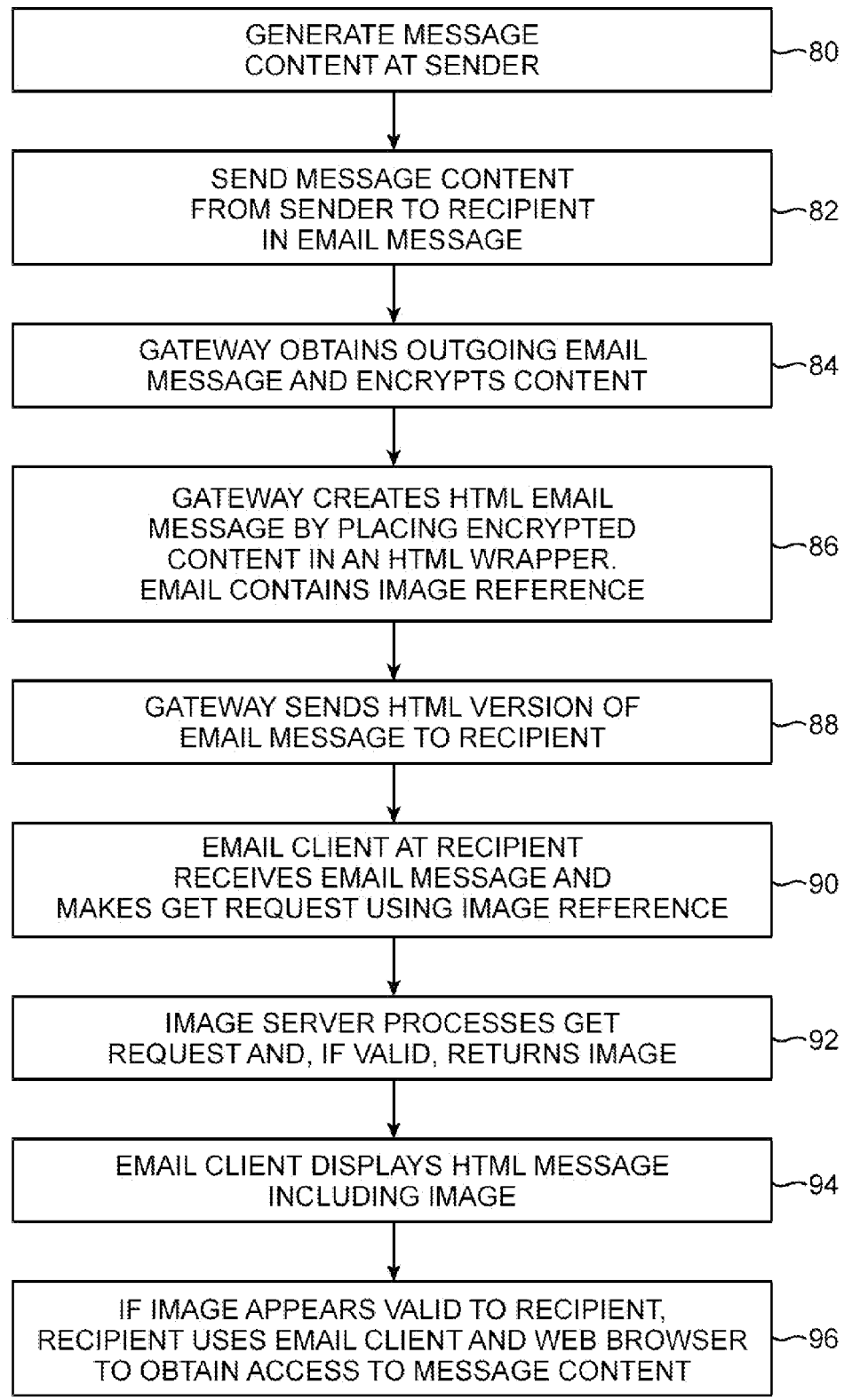
FIG. 8 is a flow chart of illustrative steps involved in communicating with secure email messages that contain personalization information in accordance with the present invention.

Illustrative steps involved in using the system of FIG. 3 to securely deliver a message from a sender to a recipient are shown in FIG. 8.

At step 80, the sender uses equipment 12 to generate the content of a message to be conveyed to a desired recipient. The sender may be, for example, a computer system associated with a bank or other financial organization.

The sender forms an email message that is addressed to the recipient's email address and sends the email message to the recipient at step 82.

At step 84, the gateway 40 intercepts the outgoing email message from the sender and encrypts the contents of this message using IBE encryption engine 18. The inputs to IBE encryption engine 18 are the IBE public key of the recipient and the IBE public parameters associated with IBE private key generator 16.

At step 86, the gateway creates an html version of the email message by placing the encrypted content in an html wrapper. The html version of the email message forms a notification message that contains the encrypted message as an attachment. The notification message is addressed to the desired recipient and includes a personalization image appropriate for that particular recipient. The personalization image may be included in the form of an image reference.

The html version of the email message is sent to the recipient over the Internet 14 from the gateway 40 at step 88. The email message is sent to the recipient in the clear in that it is sent over an unsecured link. As a result, the personalization image is sent to the recipient in the clear (i.e., over an unsecured link in unencrypted form).

At step 90, the email client 36 at the recipient receives the html version of the email message. While processing the email message for presentation to the recipient, the email client detects the embedded image reference in the email message. Following normal html procedures, the email client formulates an http get request using the image reference.

The image server 38 receives the get request from the email client over network 14 at step 92. During step 92, the image server 38 processes the get request and determines whether it is valid. A phishing attacker cannot construct valid image references because the phishing attacker does not have access to the secret K, which is shared between the gateway 40 and the image server 38.

If the image request is invalid, the image server 38 can decline to satisfy the get request or can take other appropriate action (e.g., by providing a warning to the recipient). If the image request is valid, the image server produces the appropriate image data for the requested personalization image and provides the personalization image to the recipient over network 14.

At step 94, the email client 36 receives the personalization image 58 from the image server 38 and displays the personalization image with the rest of the notification message (i.e., with the instructions and attachment in the notification message, as described in connection with FIG. 4).

The recipient follows the instructions in the displayed message and inspects the displayed personalization image. If the recipient recognizes that the personalization image is valid, at step 96 the recipient uses the email client to launch the web browser 44 (e.g., by opening the attachment 50 of FIG. 4 by double-clicking on the attachment displayed by the email client) and thereby obtains access to the message content (e.g., the recipient uses the procedures described in connection with FIGS. 5, 6, and 7 to obtain access to message content).

Figure 9:
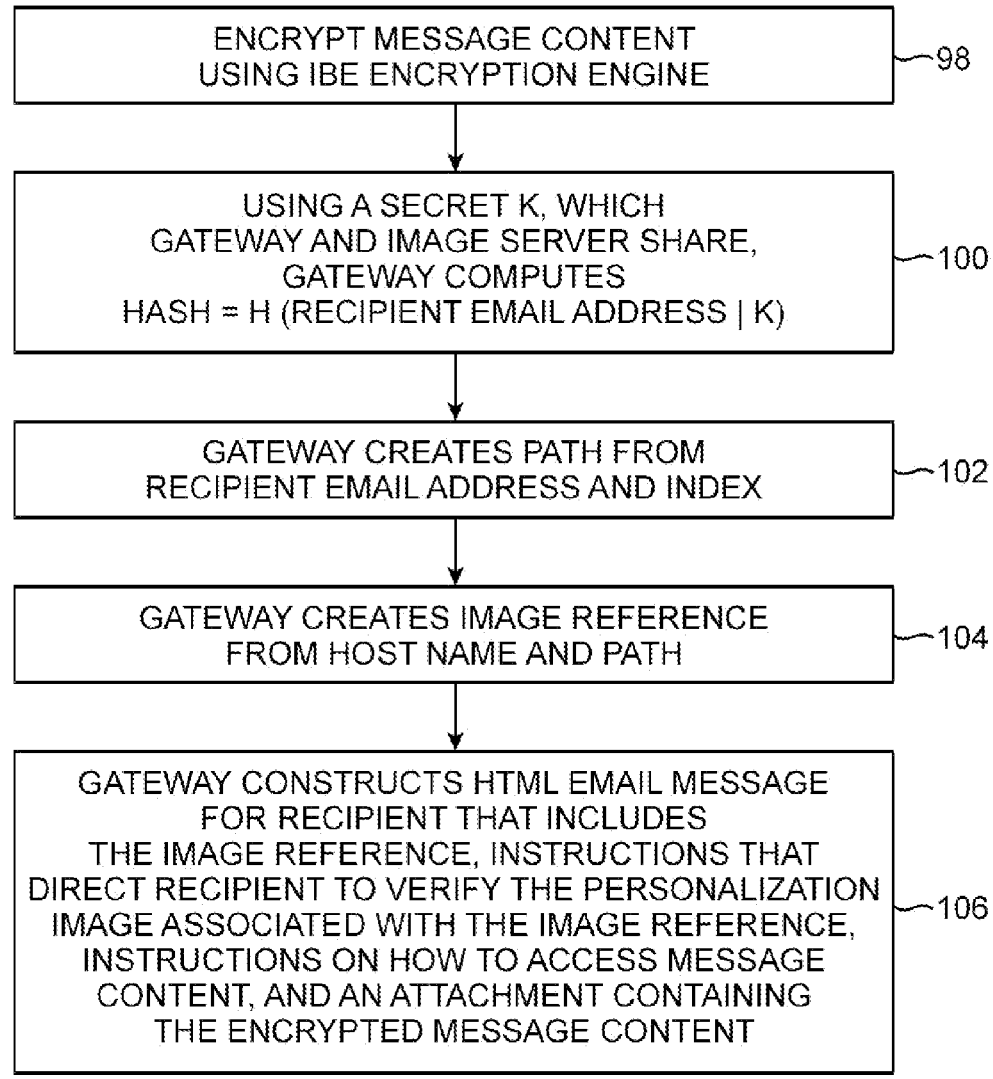
FIG. 9 is a flow chart of illustrative steps involved in the message encryption and message creation operations of FIG. 8 in accordance with the present invention.

Illustrative steps involved in performing the operations of steps 84 and 86 of FIG. 8 are shown in FIG. 9. At step 98, the gateway 40 encrypts the contents of the message generated by the sender using IBE encryption engine 18.

At step 100, the gateway computes the value of a parameter HASH using equation 1.

$$\text{HASH} = H(\text{recipient\_email\_address} | K) \quad (1)$$

In equation 1, H is a one-way function such as a hash function, recipient_email_address is the email address of the recipient, and K is a secret that is shared between gateway 40 and image server 38. The vertical bar symbol in equation 1 denotes a concatenation operation. Because H is a one-way function, the operation of equation 1 obscures K, so K cannot be obtained by attackers when the image reference is sent over the Internet in the clear.

At step 102, the gateway 40 constructs a path from the recipient email address and the value of HASH using equation 2.

$$\text{PATH} = /\text{images}/\text{recipient\_email\_address}/\text{HASH} \quad (2)$$

The parameter PATH identifies the path to the personalization image on the image server 38. The string "images" in this example defines the location on image server 38 where images are stored. The use of this type of string is optional, but is helpful when segregating image data from other resources on the server.

The image server 38 has a host name ("HOST_NAME"), which identifies its location on the Internet.

At step 104, the gateway 40 creates the image reference ("IM_REF") from the host name and the path, using equation 3.

$$\text{IM\_REF}=\text{<imgsrc="http://HOST\_NAME/PATH.jpg"} \quad (3)$$

In this example, the gateway added a ".jpg" image extension to indicate that the reference corresponds to JPEG picture data. This is merely illustrative. For example, gateway 40 could add a ".gif" extension or other suitable image extension.

At step 106, the gateway constructs an html version of the email message from the sender by placing the encrypted message content from step 98 into an html wrapper. The encrypted content can be included in the html version of the message as an attachment. The html version of the message includes the image reference IM_REF and preferably includes instructions that direct the recipient to verify that the personalization image is valid before proceeding with message decryption. The html version of the message also preferably includes instructions on how to access the image. The attachment preferably includes the encrypted message content, the instructions regarding image verification, the image reference, and the instructions regarding message decryption so that when the attachment is decrypted, these items can continue to be displayed for the recipient in the recipient's web browser to provide continuity.

Figure 10:
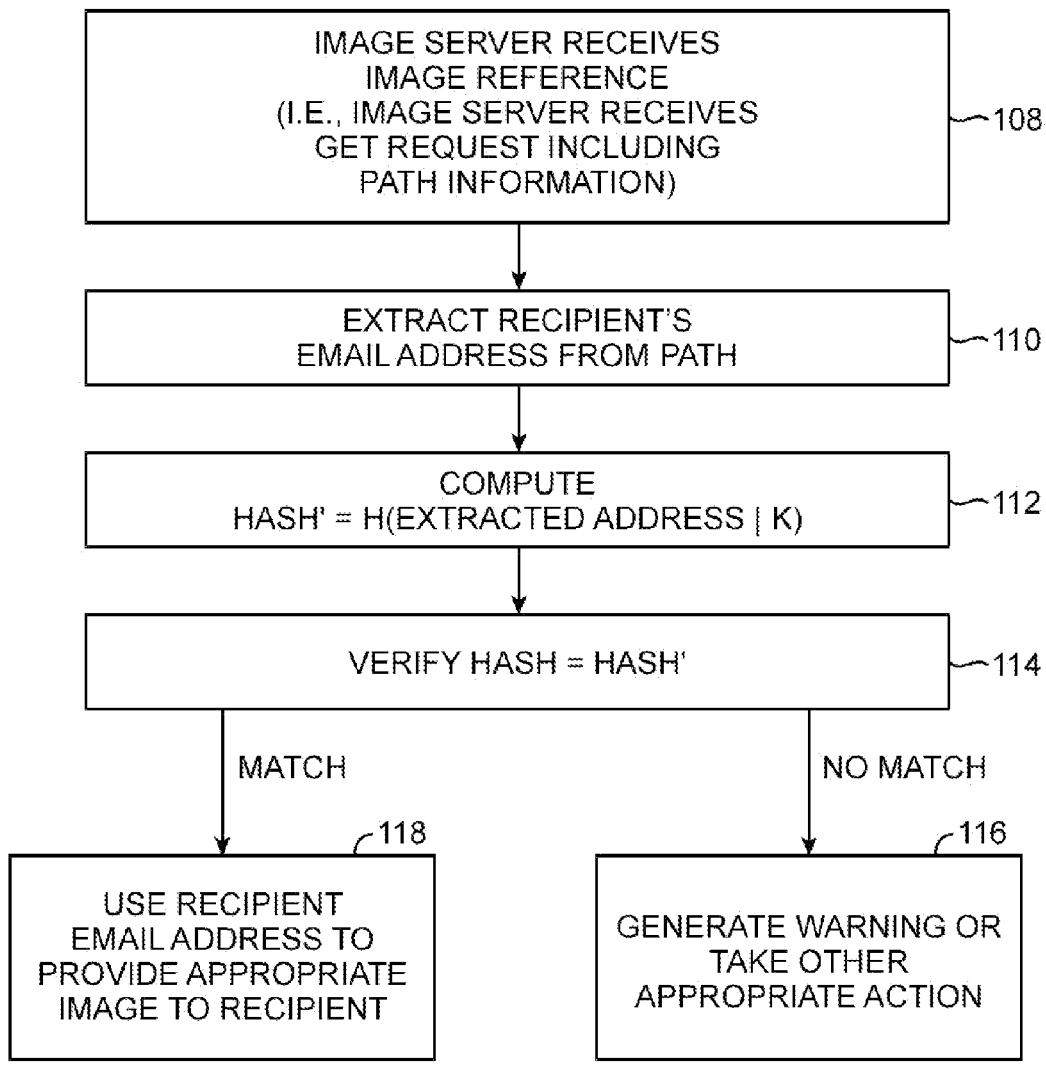
FIG. 10 is flow chart of illustrative steps involved in processing an image reference associated with a personalization image at an image server in accordance with the present invention.

During step 92 of FIG. 8, the image server 38 processes the image reference IM_REF received from the recipient's web browser. FIG. 10 contains a flow chart of illustrative steps involved in the image reference processing operations of step 92.

At step 108, the image server 38 receives the image reference. In a typical scenario, the image server receives IM_REF in an http get request from the web browser 44 over the Internet. The get request for IM_REF includes the path information PATH (from equation 2).

At step 110, the image server extracts the value of recipient_email_address from PATH. The recipient's email address is used as a form of recipient ID to identify which personalization image data is to be provided to the recipient.

At step 112, the image server computes the value of HASH', using equation 4.

$$\text{HASH'}=H(\text{recipient\_email\_address}|K) \quad (4)$$

Because both the image server and the gateway share the same secret K, the image server is able to use K in computing the value of HASH'.

At step 114, the image server 38 extracts the value of HASH from the value of PATH received in IM_REF and compares the received value HASH to the computed value HASH'. This operation verifies whether IM_REF is a valid image reference from a legitimate recipient or is a spoofed image reference created by an attacker.

If the values of HASH and HASH' do not match, the image server may decline to respond to the get request, may send a warning to the recipient over the network in response to the get request, or may take other appropriate actions (step 116).

If the values of HASH and HASH' match, the image server can conclude that the image reference is legitimate. At step 118, the image server may therefore provide the personalization image corresponding to the image reference to the recipient's web browser 44 to display to the recipient. The image server may use the value of recipient_email_address that was extracted from PATH at step 110 in determining which personalization image to provide to the recipient.

Figure 11:
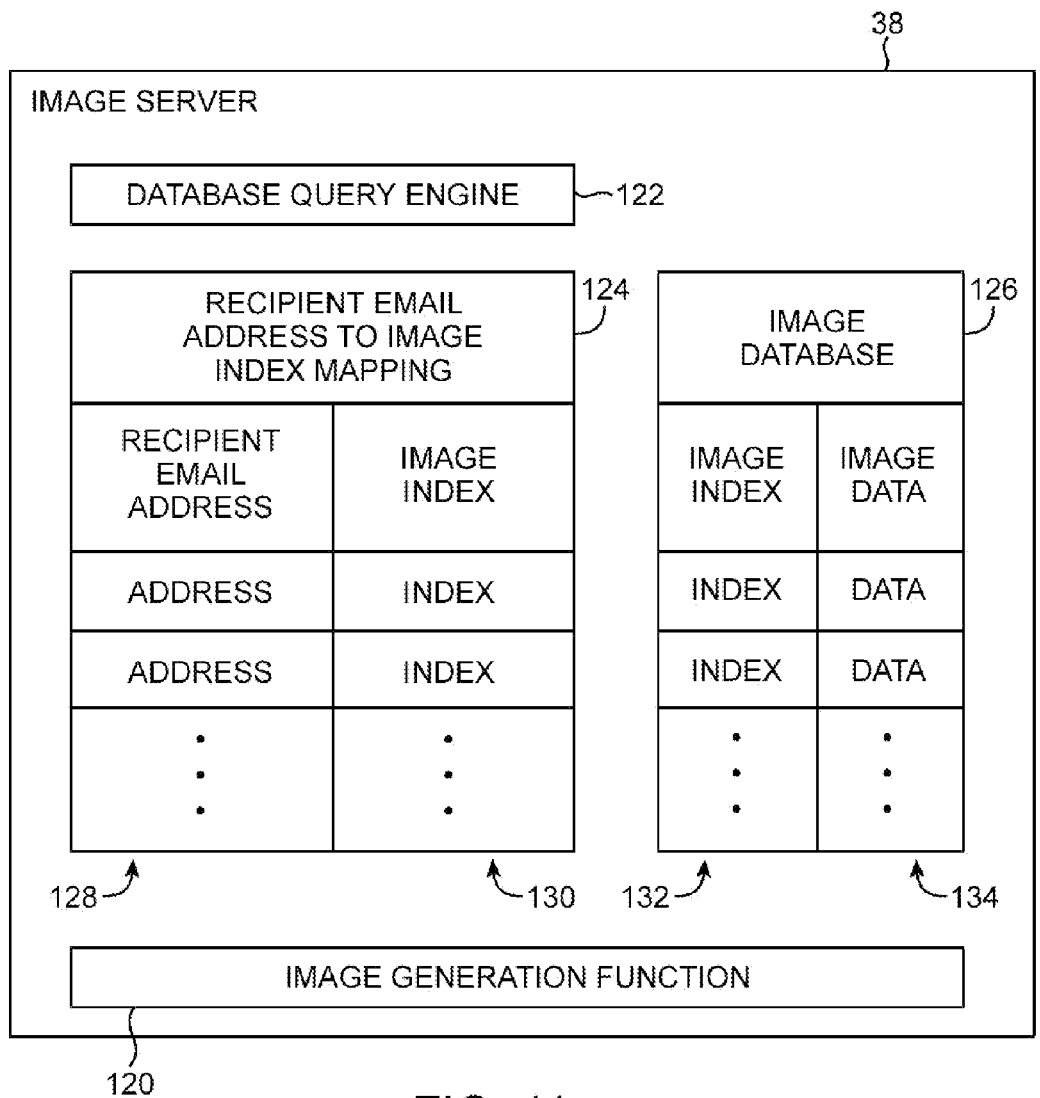
FIG. 11 is a diagram of an illustrative image server that may be used to present email recipients with personalization images in accordance with the present invention.

Any suitable technique may be used to provide the correct personalization image to the recipient. The image server 38 may, for example, have an image generation function 120 as shown in FIG. 11, which dynamically creates the personalization image based on the recipient's email address. As another example, the image server may use a database query engine 122 to retrieve the personalization image from a database. In the illustrative arrangement of FIG. 11, database query engine uses information in table 124 and database 126 to retrieve stored personalization images. Table 124 has a column of recipient email addresses 128 and a corresponding column of image indexes 130. Each row of table 124 maps a recipient email address to an index value. Database 126 contains a column of image indexes 132 and a corresponding column of image data files 134. Each row of database 126 maps an index to the image data for a corresponding personalization image (e.g., a .jpg file).

Image server 38 can use software such as query engine 122 and table 124 and database 126 to look up which image data corresponds to the recipient_email_address value extracted from the path at step 110 (FIG. 10), can use a dynamic image generation function 120 to create the appropriate personalization image for the recipient in real time, or can use a combination of these approaches.

Figure 12:
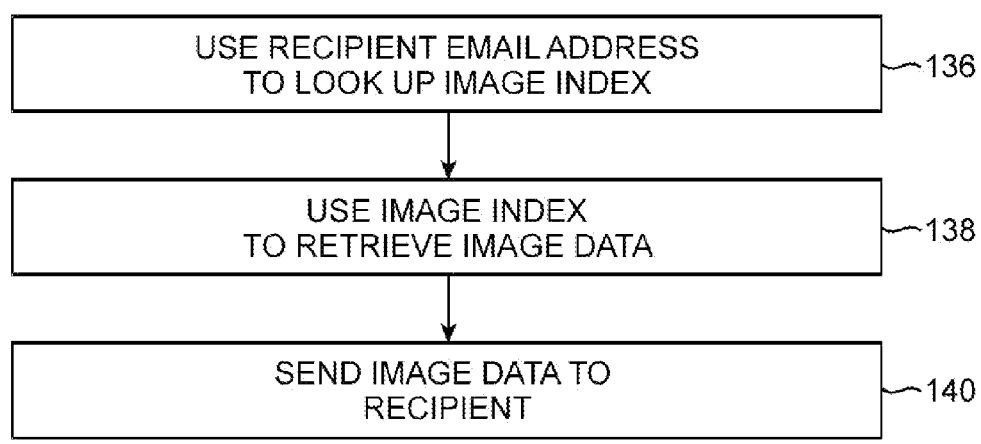
FIG. 12 is a flow chart of illustrative steps involved in using an image server of the type shown in FIG. 11 to retrieve a stored personalization image for a recipient in accordance with the present invention.

Illustrative steps involved in using an image data look-up approach during step 118 of FIG. 10 are shown in FIG. 12.

At step 136, the image server uses database query engine 122 to look up which index corresponds to the recipient's email address (recipient_email_address) in table 124 (FIG. 11). Any suitable technique may be used to establish the address-to-index mapping of table 124. For example, image server 38 may assign a default image index to each recipient in system 32 (FIG. 3). If desired, the recipient can be provided with an opportunity to select a desired image (e.g., to replace a default image). Image selection may take place, for example, during a setup process in which user credentials such as username and password settings are established. A user may also be provided with online account management functions that allow the user to update their personalization information at a later time.

At step 138, the image server uses the index that has been obtained at step 136 to retrieve the corresponding image data 134 from image database 126. In particular, image server 38 uses the image in performing a look-up operation on database 126. By matching the index obtained at step 136 with an index entry in a row of database 126, the image server can identify which image data 134 corresponds to the index.

The image data that has been retrieved at step 138, which may be, for example, a .jpg file containing the personalization image, is sent to the recipient at step 140.

If desired, image server 38 may use an image generation function 120 to generate the personalization image for the recipient during step 118 of FIG. 10, as described in connection with FIG. 11.

Figure 13:
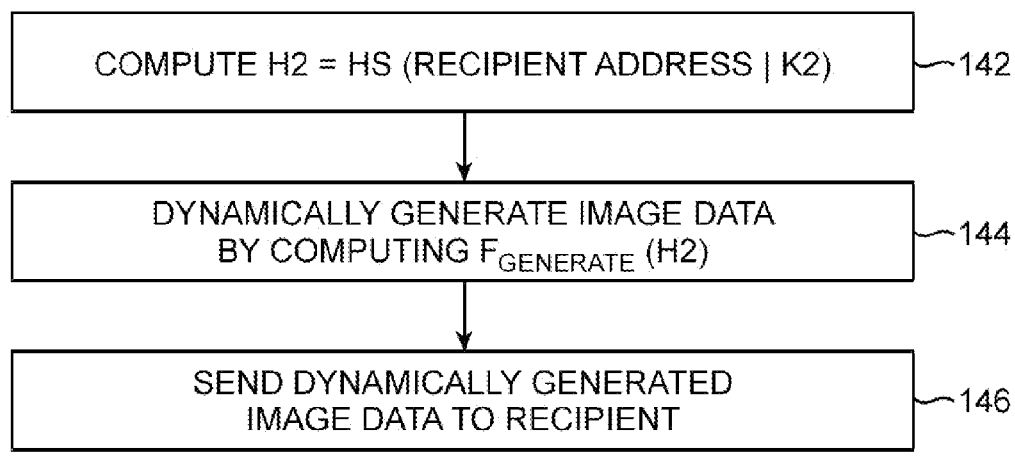
FIG. 13 is a flow chart of illustrative steps involved in using an image server of the type shown in FIG. 11 to dynamically generate a personalization image for a recipient in accordance with the present invention.

Illustrative steps involved in using a dynamic image generation scheme during step 118 of FIG. 10 are shown in FIG. 13.

At step 142, the image server computes the value of a parameter H2 using equation 5.

$$H2=HS(\text{recipient\_email\_address}|K2) \quad (5)$$

In equation 5, K2 is a secret which is private to the image server and HS is a one-way function such as a hash function. The parameters H2 that are computed by the image server are unique to each recipient. Because K2 is secret to the image server, phishing attackers cannot systematically produce values of H2 to use in attempts to construct fraudulent images.

At step 144, the image server uses the value of H2 as an input to an image generation function $F_{GENERATE}$ to produce the image data for the recipient's personalization image. Any suitable image generation function may be used for $F_{GENERATE}$. For example, the image generation function $F_{GENERATE}$ may map particular characters in the value of H2 to particular colors, pattern attributes (e.g., strips, dots, lines, etc.), brightness and contrast settings, etc.

At step 146, the image data that was dynamically generated by $F_{GENERATE}$ using the value of H2 is sent to the recipient over network 14 by the image server in response to receipt of the image reference by the image server.

Figure 14:
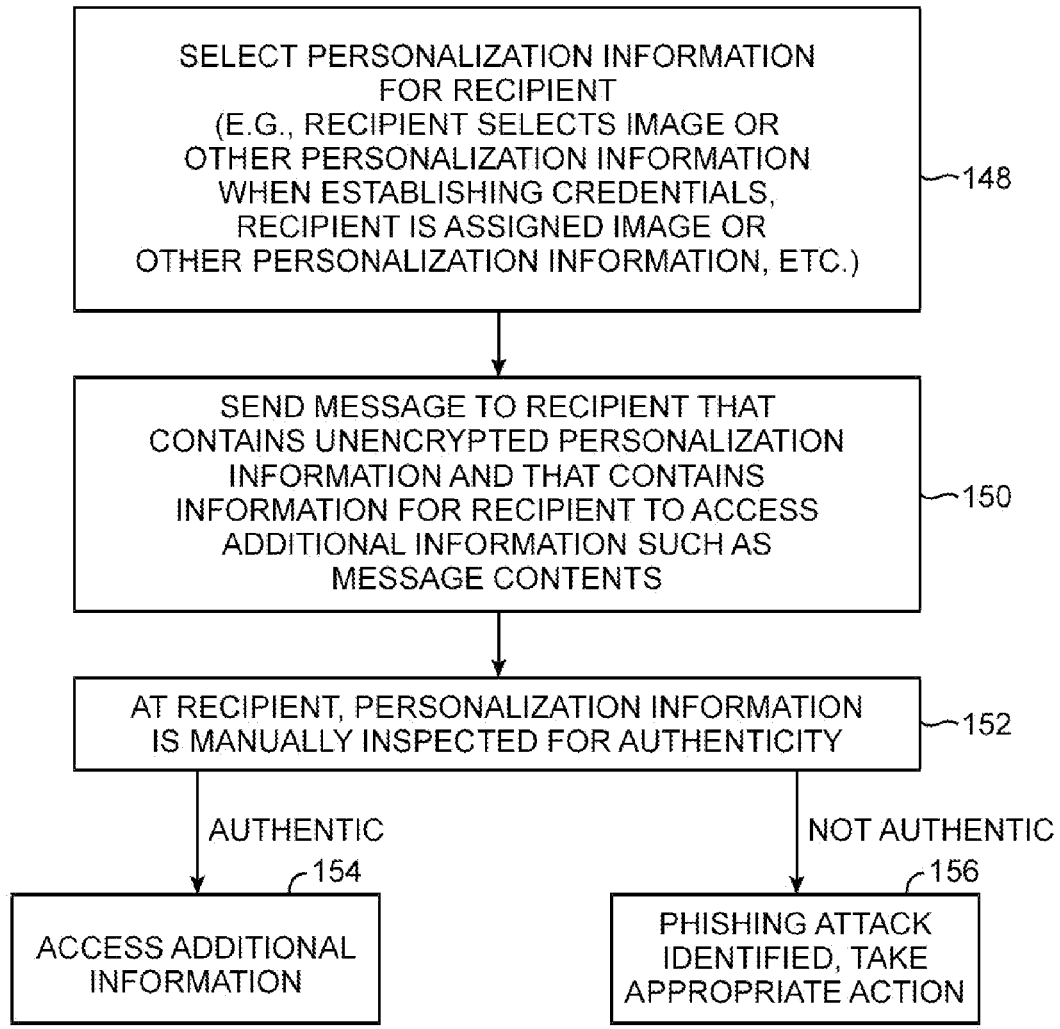
FIG. 14 is a generalized flow chart of illustrative steps involved in using personalization information to combat phishing attacks during secure communications between a message sender and recipient in accordance with the present invention.

A flow chart of generalized steps involved in using personalization information such as personalization images to help combat phishing attacks is shown in FIG. 14.

At step 148, personalization information is assigned to a recipient. The recipient may select the personalization information or equipment at the organization such as image server 38, gateway 40, and/or private key generator 16 in the example of FIG. 3 may assign personalization information to the recipient. In the event that the recipient is assigned default personalization information, the recipient may be provided with an opportunity to select a replacement for the default assignment or to modify the default assignment.

The personalization information may be assigned and modified at any suitable time. For example, the personalization information may be selected when a recipient of an encrypted message is first signing up for a service and is providing user credentials such as username and password credentials. If desired, personalization information may be uploaded to the organization 34 over the Internet 14 during sign up operations (e.g., over an SSL link). The personalization information may include personalization text, personalization graphics and other images, personalization video (including audio), personalization audio, and any suitable combinations of these personalization items. The personalization information is preferably easy for the recipient to recognize, while being specific enough to make phishing attacks containing the personalization information uneconomical. The personalization information is also preferably not too sensitive. Personalization information is sent over the Internet in the clear (i.e., in unencrypted form), so it is generally desirable to avoid using sensitive financial data such as bank account and credit card numbers as the personalization information.

At step 150, the organization 34 sends a message to the recipient that contains the unencrypted personalization information. The message may be an email message, an instant message, or any other suitable message. The message may include encrypted content such as IBE-encrypted content. The message preferably contains information that instructs the recipient to check whether the personalization information is valid. The message may also contain information on accessing additional content (e.g., securely over an SSL link). In the example of FIGS. 1-13, the information that is accessed is IBE-encrypted message content. This is merely illustrative. For example, the additional content that is accessed by following the message instructions may be, for example, unencrypted web content.

At step 152, the message is sent to the recipient and displayed for the recipient by the recipient's email client, web browser, or other appropriate client software. The personalization information may be embedded in the message in the form of actual personalization data (e.g., an image file) or may be included in the message in the form of a reference to a remote resource (e.g., an image reference). The recipient inspects the personalization information to determine whether it is authentic. If, for example, the recipient established a particular image for use as the recipient's personalization information, the recipient visually reviews the screen being displayed for the recipient to determine whether the correct personalization image is present.

The absence of the personalization image or the presence of an incorrect personalization image indicates that the message was generated as part of a phishing attack, so the recipient can delete the message or take other appropriate action at step 156.

If the personalization information is valid, the recipient can access the additional information at step 154. The way in which the additional information is accessed depends on the nature of the additional information. For example, if the additional information includes an IBE-encrypted message, the decrypted contents of the IBE-encrypted message may be accessed using the operations described in connection with FIGS. 4-7. As another example, the original message (i.e., the notification message from the organization) may be notifying the recipient about a new product or service that is available at the organization's web site. The notification message may contain a web link that the recipient can click on to view a web page that is promoting the new product or service. In this situation, the additional information that is accessed during step 154 may be a web page of information related to the message. The web page may be accessed by clicking on a web link in the notification message after verifying that the personalization image is authentic.

Figure 15:
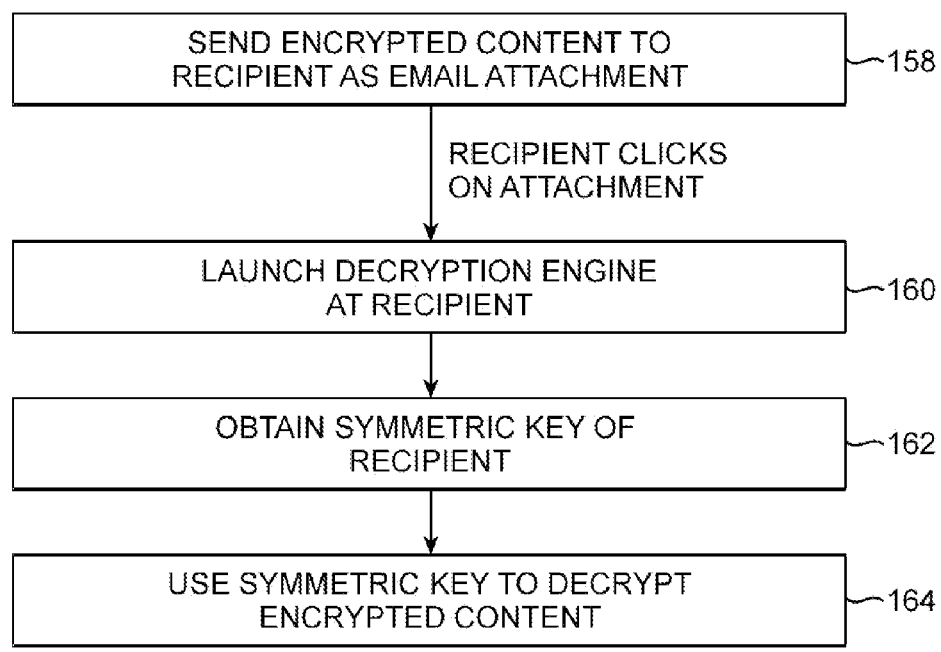
FIG. 15 is a flow chart of illustrative steps involved in using a decryption engine at the recipient to decrypt a secure email message in accordance with the present invention.

In scenarios in which message content is encrypted, various decryption techniques may be used. The flow chart of FIG. 15 shows illustrative steps involved in decrypting encrypted message content using a so-called active content approach.

With this type of approach, encrypted content is sent to a recipient by the gateway 40 of the organization as an email attachment (step 158) that is attached to a notification message. Following verification of the personalization information in the notification message, the recipient clicks on the attachment.

Clicking on the attachment launches a decryption engine on the recipient's equipment (step 160). The decryption engine may be implemented using a Java script, an ActiveX control, or other suitable platform-independent software than can be run on the recipient's equipment without involving the operations normally required to install a new software package. With this type of self-extracting decrypter arrangement, it is not necessary for the recipient's organization to permit new software installations, provided that the recipient's equipment is permitted to run Java scripts or other such applets.

After the decryption applet has been launched at step 160, the applet obtains an appropriate decryption key to use in decrypting the encrypted content. With one suitable approach, symmetric key encryption is used for encrypting the content at step 158. Accordingly, during step 162, the decryption applet obtains the symmetric key for the recipient. The symmetric key may be a password selected by the recipient when the recipient signed up with a service at the organization 34. The password can be obtained from the recipient's equipment (e.g., by retrieving the password from the recipient's equipment) or a prompt may be displayed for the recipient to enter the password.

After obtaining the symmetric key at step 162, the symmetric key is used in decrypting the encrypted content at step 164.

In the example of FIG. 15, a symmetric key cryptographic algorithm was used and an active-content scheme was used for message packaging. Other schemes may be used if desired. In general, cryptographic schemes may be used based on identity-based encryption of message content (as described in connection with FIGS. 1-3), based on PKI public key encryption of message content, and symmetric key encryption of message content. Messages can also be conveyed securely without encryption (e.g., by conveying messages to a recipient by storing a message on a server and notifying the recipient that the message is available for retrieval without encrypting the message).

Figure 16:
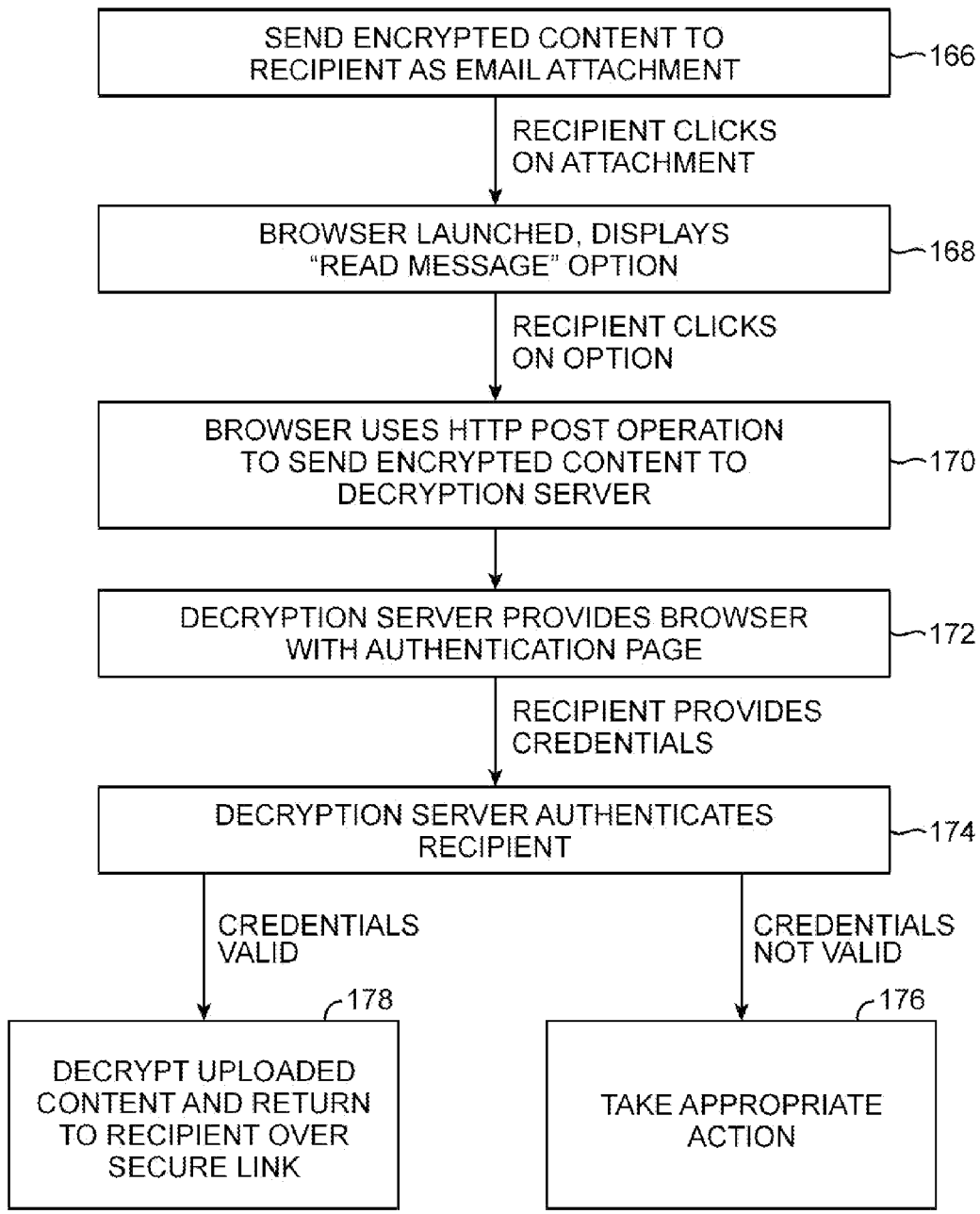
FIG. 16 is a flow chart if illustrative steps involved in using a decryption engine on a remote decryption server to decrypt a secure email message for a recipient in accordance with the present invention.

A flow chart of illustrative steps involved in delivering message content by packaging the content in an attachment is shown in FIG. 16. The example of FIG. 16 uses a packaging arrangement of the type described in connection with FIG. 8 and applies to IBE, PKI, and symmetric key cryptographic systems.

At step 166, encrypted content is sent from a sender to a recipient as an email attachment. The content may be encrypted by an encryption engine using an IBE encryption algorithm, a PKI encryption algorithm, or a symmetric key encryption algorithm. In a typical scenario, the encryption engine runs on a gateway at the sender's organization, as shown in FIG. 3. The email message or other message that is sent to the recipient at step 166 includes personalization information, which the recipient verifies before initiating decryption operations.

At step 168, the recipient clicks on the attachment. Clicking on the attachment launches the recipient's web browser. The information displayed by the browser contains a read message option or other suitable clickable option for the recipient.

When the recipient clicks on the option, the browser uses an http post operation or other suitable operation to send the encrypted message content over network 14 to a remote decryption server such as decryption server 42 of FIG. 3 (step 170).

At step 172, the decryption server receives the encrypted message content and the decryption server (or an agent) provides the recipient's web browser with an authentication web page.

After the recipient enters the recipient's username and password into the authentication page or otherwise provides suitable recipient credentials to the organization, the decryption server (or agent) authenticates the recipient at step 174.

If the recipient's credentials are not valid, the decryption request can be ignored or other suitable action can be taken at step 176.

If the recipient's credentials are valid, the decryption server 42 can obtain the recipient's decryption key. At step 178, the decryption engine uses the recipient's decryption key to decrypt the uploaded encrypted message content from the attachment. The resulting unencrypted version of the message is returned to the recipient's web browser over a secure link at step 178.

Messages may be conveyed securely by storing content on a server and notifying the recipient that the stored message is available for retrieval. If the recipient retrieves the message over a secure link such as an SSL link, the message can be delivered securely without encryption. If desired, IBE cryptography, PKI cryptography, or symmetric key cryptography may be used to encrypt and decrypt the message (in addition to or instead of using a secure link for message retrieval).

Figure 17:
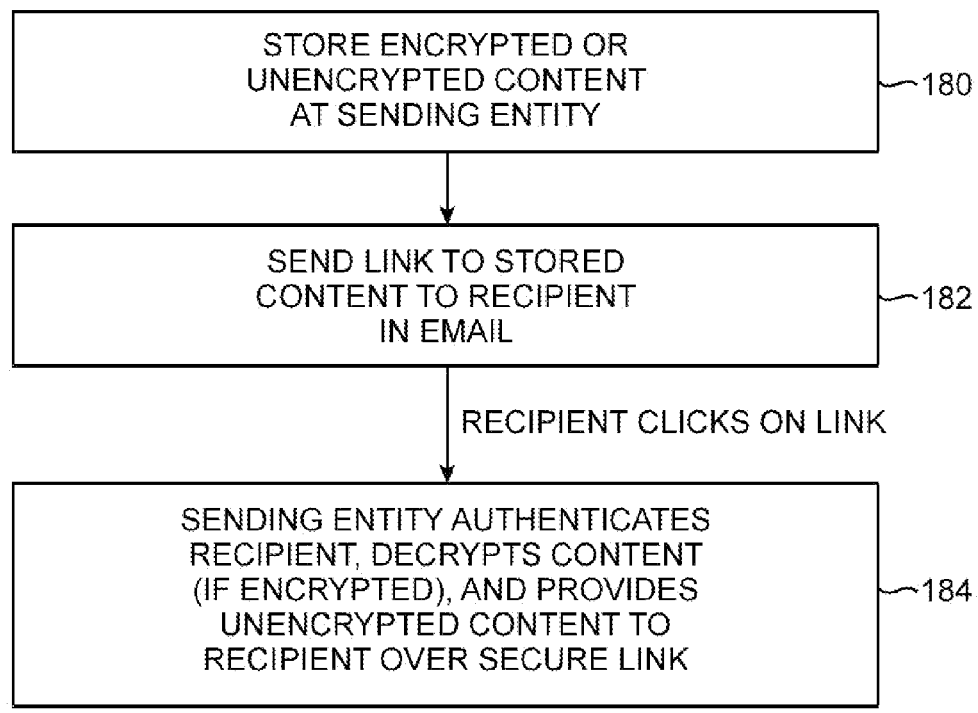
FIG. 17 is a flow chart of illustrative steps involved in providing a recipient with secure access to message contents stored on a remote server in accordance with the present invention.

Illustrative steps involved in this type of sever-based messaging scheme are shown in FIG. 17.

At step 180, a sender sends a message and equipment at the organization (e.g., gateway 40 of FIG. 3) stores an encrypted or unencrypted version of the contents of the message. The message may be stored at any suitable location. For example, the message may be stored on the gateway or another suitable server at the organization.

At step 182, the gateway 40 sends a notification message to the recipient. The notification message includes the personalization information for the recipient, so the recipient can determine whether or not the notification message is legitimate. Unlike the message packaging scheme described in connection with FIG. 16 in which encrypted message contents is included in the notification message as an email attachment, with the server-based scheme of FIG. 17, the message contents is not attached to the notification message.

The notification message preferably includes instructions that direct the recipient to verify the personalization information. If the personalization information is a personalization image, the personalization information may include an image reference. The notification message also preferably includes instructions that inform the recipient how to access the message. For example, the notification message can contain a web link and instructions that the recipient should click on the web link to access the message.

When the recipient clicks on the link, the recipient's web browser is directed to the web site specified by the link (step 184). The sending entity (e.g., the gateway or other server that communicates with the recipient's web browser in response to clicking on the link), may authenticate the recipient. For example, the gateway or other server at the organization may provide the recipient with an authentication page with which the recipient can provide the recipient's authentication credentials to the organization.

After the recipient has been authenticated, the server can decrypt the message contents (if encrypted) and can provide the unencrypted version of the message contents to the recipient over a secure link (e.g., in the form of a web page delivered to the recipient over an SSL link).

In some situations, an organization desires to communicate with its customers to promote a new product or service or to provide other information. In these situations, it is not critical that the recipient receive a particular message securely. However, it is important that the recipient not be deceived by phishing attackers.

Consider as an example, an online business that wishes to distribute an email newsletter (e.g., in html format). Certain customer have signed up with the online business (e.g., when setting up an account during a previous purchase transaction, etc.). During the sign up process, the customers established credentials such as username and password credentials and were either assigned or selected a personalization image or other suitable personalization information. These customers may also have indicated a desire to receive the newsletter.

When the business sends the newsletter in a mass email mailing to the appropriate recipients, the gateway intercepts each outgoing email message and inserts appropriate personalization information for each recipient. The newsletter may contain a link to the business organization's web site, where the recipients are expected to shop and provide sensitive information such as credit card information. By including the personalization information in the newsletter, the recipients are able to check for the presence of the personalization information before clicking on the link. Phishing attackers will not be able to successfully trick the recipients, because phishing attackers will not be able to economically forge a newsletter containing appropriate personalization information for each recipient.

Figure 18:
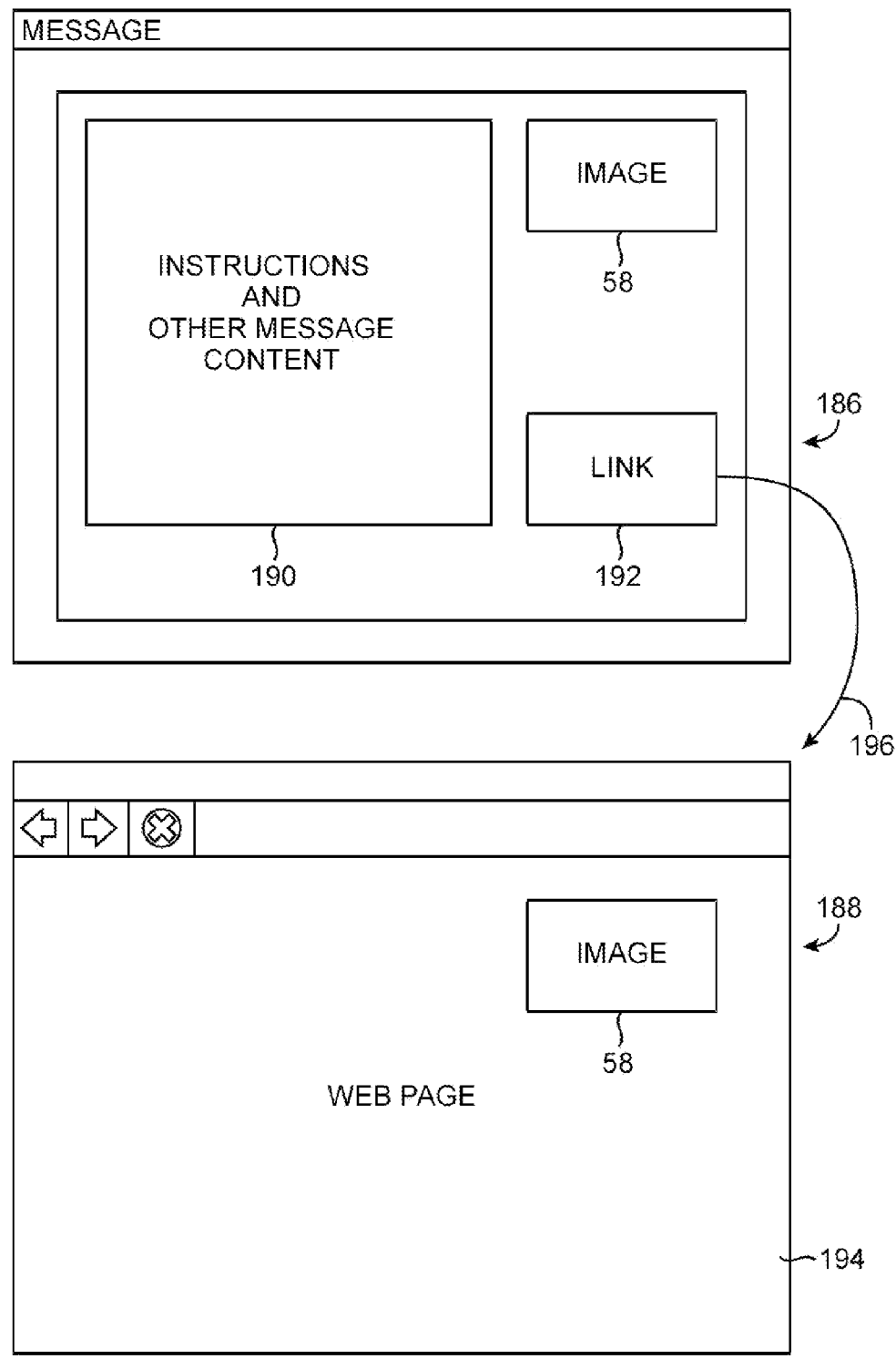
FIG. 18 shows illustrative email client and web browser screens that may be presented to an email recipient when the recipient receives an email message and clicks on a link in the message in accordance with the present invention.

Illustrative screens that may be displayed for a recipient during this type of scenario are shown in FIG. 18. Initially, the recipient's email client receives the newsletter or other suitable email message from the organization. The email client displays a message screen for the recipient such as message screen 186. The message associated with screen 186 serves as a type of notification message because it is notifying the recipient about the availability of web page content associated with web link 192. Preferably, the notification message includes a personalization image 58 that is associated with the recipient and instructions and other message content 190. The instructions and message content 190 may, for example, include information about the organization's products or a sale at the organization's store. The instructions 190 preferably include information that directs the recipient to verify the image 58 before clicking on link 192.

As shown by arrow 196, when the recipient clicks on web link 192, the recipient's web browser is launched and browser screen such as screen 188 of FIG. 18 is displayed. Screen 188 includes a web page 194 corresponding to the web link 192. A server at the organization (e.g., a server associated with the gateway) is used to provide the web page 194. An image server such as image server 38 of FIG. 3 is used to provide the image 58. If desired, the image 58 may be displayed by the organization's servers regardless of which web pages the recipient browses during the browsing session. By continuing to display the personalization image in this way, the recipient continues to be assured that the recipient has not been tricked into visiting a fraudulent site.

Figure 19:
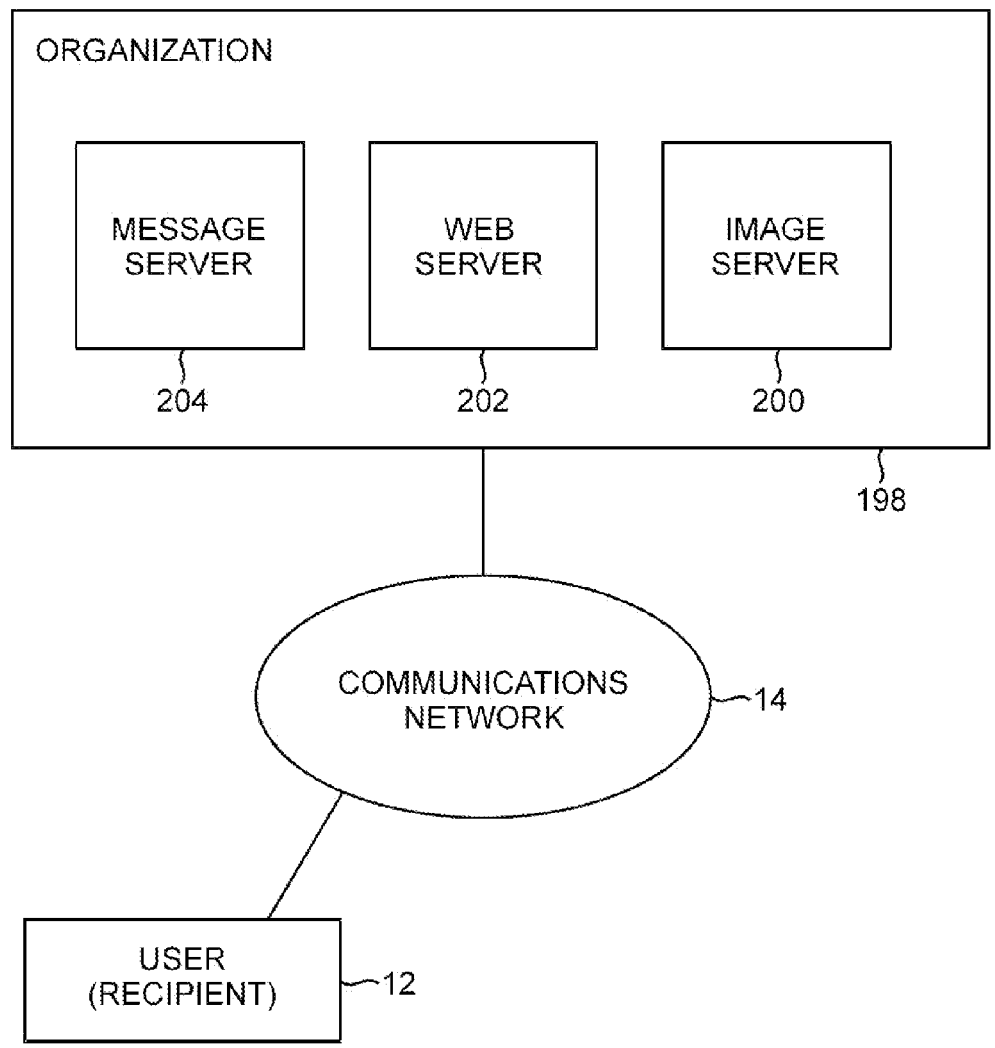
FIG. 19 is a diagram of an illustrative system that may be used in presenting a recipient with an email and web page of the type shown in FIG. 18 in accordance with the present invention.

An illustrative system in which this type of approach may be used is shown in FIG. 19. Messages such as newsletters and other email messages may be generated at a message server 204 that is associated with an organization 198. The message server 204 may be used to originate messages and/or may serve as a messaging gateway. Web server 202 provides web pages to users. To keep track of different users in the system, web server 202 may generate a unique identifier (user ID) for each user who accesses server 202. The user IDs may, for example, be based on user email addresses. The user IDs may be stored on the equipment of each user in a cookie. Image server 200 is used to provide personalization images. Message server 204 and image server 200 share the secret K that was described in connection with equations 1 and 4. Communications network 14 may include the Internet. Users such as users 12 browse the web over network 14 to retrieve web pages from web server 202. Users that receive email from message server 204 are sometimes referred to as recipients.

Figure 20:
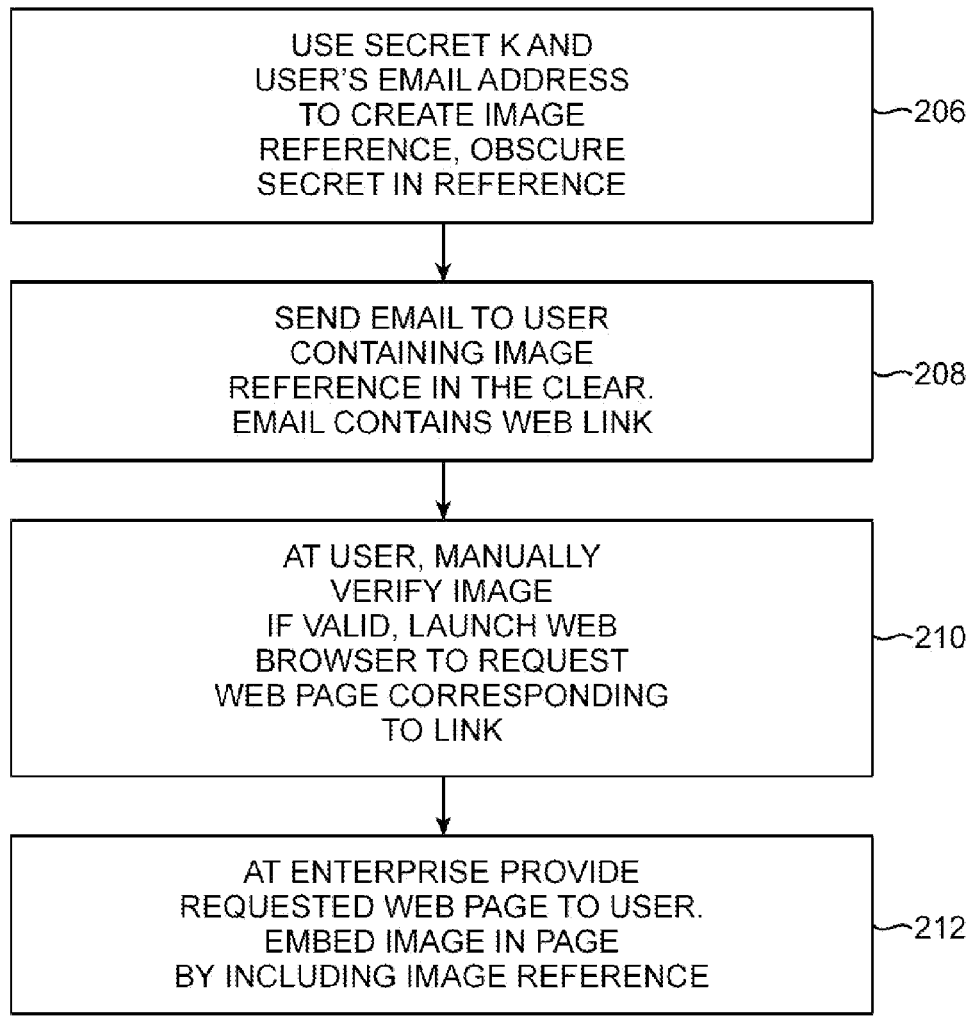
FIG. 20 is a flow chart of illustrative steps involved in presenting a recipient with an email message and web page of the type shown in FIG. 18 using a system of the type shown in FIG. 19 in accordance with the present invention.

Illustrative steps involved in using the system of FIG. 19 are shown in FIG. 20. At step 206, the organization creates an email message to be sent to a desired recipient. The organization uses the secret K and a user's email address to create an image reference IM_REF corresponding to the recipient's personalization image, as described in connection with equations 1, 2, and 3. A one-way function such as a hash function is used to obscure K in the image reference. The message server 204 (FIG. 19) or other suitable equipment associated with the organization 198 may perform the image reference and message creation functions.

At step 208, the organization embeds the image reference in the email and sends the email to the recipient. The image reference is sent in the clear, so no special authentication procedure or decryption process is required to view the personalization image at the recipient's web browser. The email preferably contains instructions that direct the recipient to verify the personalization image before proceeding. The email also preferably contains a web link associated with web server 202. The web link may contain user ID information such as the recipient's email address to identify the recipient.

At step 210, the recipient manually verifies that the personalization image in the email is valid by visual inspection. The recipient then clicks on the embedded web link. This launches the recipient's web browser and sends the web link to the web server 202 in the form of a page request corresponding to the link.

At step 212, the web server receives the page request. Recipient email address information or other user ID information in the page request can be used to identify the recipient and can be placed in a cookie on the recipient's equipment or otherwise retained for the duration of the recipient's web session to keep track of the recipient during browsing. The image server 200 uses the recipient's email address to generate an appropriate personalization image reference, which is displayed as a personalization image in the web pages presented to the recipient.

Each time the recipient requests a web page, the appropriate personalization image may be included in the page. In this way the recipient is assured that the web site is authentic for the entire duration of the browsing session at the organization's web site. The image references sent to users in the system of FIG. 19 are not encrypted, so they are susceptible to interception by a phishing attacker. However, there are preferably numerous distinct personalization images in the system. Phishing attacks are not economical in this environment, because randomly associating intercepted personalization images with a list of harvested email addresses will not likely produce any significant number of appropriate matches. A recipient who receives a forged email messages from an attacker will likely receive someone else's personalization image and will therefore be alerted that a phishing attack is underway.

Although described in the context of a browsing session that is initiated by an email message, the web page personalization approach of FIGS. 18-20 may also be used during browsing sessions that are initiated without a notification message. For example, an organization can allow users to establish accounts. During the sign-up process, the users are assigned or select personalization information such as a personalization image. When a user subsequently visits the same web site, the web site can detect the user's presence using a cookie. The web site can then generate and display the personalization image on the web pages presented to the user during the browsing session. This approach helps to combat phishing attacks, because if a recipient of a fraudulent email is tricked into visiting a fraudulent web site, the absence of the appropriate personalization image on the web site will alert the recipient to the fraud.

The foregoing is merely illustrative of the principles of this invention and various modifications can be made by those skilled in the art without departing from the scope and spirit of the invention.

What is claimed is:

1. A method for communicating securely in an identity-based encryption (IBE) system in which message content is to be sent over a communications network from a sender at an organization to a recipient, wherein the recipient has an associated personalization image, comprising:

at the sender, sending the message content from the sender to the recipient;

at a gateway associated with the organization, obtaining the message content sent by the sender and encrypting the message content using an IBE encryption engine and the IBE public key of the recipient;

at the gateway, creating an html email message that includes the encrypted message content and the personalization image associated with the recipient;

sending the email message to the recipient, wherein the personalization image in the email message is sent in the clear without encryption;

receiving the email message at the recipient;

displaying the personalization image at the recipient for determination by visual inspection at the recipient of whether the personalization image is correct for the recipient; and in response to determining by visual inspection at the recipient that the personalization image is correct for the recipient, using a web browser at the recipient to obtain access to an unencrypted version of the encrypted message content.

2. The method defined in claim 1, wherein using the web browser comprises using the web browser to transmit the encrypted message content from the email message to a decryption engine associated with the organization over the communications network.

3. The method defined in claim 1 wherein displaying the personalization image at the recipient comprises using an email client to display the personalization image for the recipient.

4. The method defined in claim 1 wherein creating the email message comprises creating an email message that includes instructions that direct the recipient to visually inspect the personalization image for validity.

5. The method defined in claim 1 wherein creating the email message comprises creating an email message that includes the encrypted message content in an email attachment, instructions that direct the recipient to visually inspect the personalization image for validity, and instructions that direct the recipient to open the attachment to access the message content.

6. The method defined in claim 1 wherein creating the email message comprises creating an email message that includes the personalization image in the form of an embedded image reference.

7. The method defined in claim 1 further comprising:

at the gateway, using a hash function in generating an image reference, wherein creating the email message comprises creating an email message that includes the personalization image by embedding the image reference in the email message.

8. The method defined in claim 1 wherein there is an image server associated with the organization and wherein the image server and the gateway share a secret, the method further comprising:

at the gateway, using the shared secret and an email address associated with the recipient as inputs to a hash function to compute at least part of an image reference, wherein creating the email message comprises creating an email message that includes the personalization image by embedding the image reference in the email message.

9. The method defined in claim 1 wherein there is an image server associated with the organization and wherein the image server and the gateway share a secret, the method further comprising:

at the gateway, using the shared secret and an email address associated with the recipient in computing at least part of an image reference, wherein creating the email message comprises creating an email message that includes the personalization image by embedding the image reference in the email message; and at the image server, in response to receiving the image reference from the recipient, using the shared secret and the email address of the recipient in validating the image reference.

10. The method defined in claim 1 wherein there is an image server associated with the organization and wherein the image server and the gateway share a secret, the method further comprising:

at the gateway, using the shared secret and an email address associated with the recipient as inputs to a hash function to compute at least part of a path in an image reference, wherein creating the email message comprises creating an email message that includes the personalization image by embedding the image reference in the email message; and at the image server, in response to receiving the image reference from the recipient, using the shared secret and the email address of the recipient as inputs to the hash function and comparing the resulting output of the hash function produced at the image server to the part of the path computed by the gateway to validate the image reference.

11. The method defined in claim 1 wherein there is an image server associated with the organization and wherein the image server and the gateway share a secret, the method further comprising:

at the gateway, using the shared secret and an email address associated with the recipient as inputs to a hash function to compute at least part of an image reference, wherein creating the email message comprises creating an email message that includes the personalization image by embedding the image reference in the email message; and at the image server, in response to receiving the image reference from the recipient, extracting the recipient's email address from the image reference;

at the image server, using the shared secret and the extracted email address of the recipient as inputs to the hash function; and comparing the resulting output of the hash function produced at the image server to the part of the image reference computed at the gateway to validate the image reference.

12. The method defined in claim 1 wherein there is an image server associated with the organization and wherein the image server and the gateway share a secret, the method further comprising:

at the gateway, using the shared secret and an email address associated with the recipient in computing at least part of an image reference, wherein creating the email message comprises creating an email message that includes the personalization image by embedding the image reference in the email message;

at the image server, in response to receiving the image reference from the recipient, using the shared secret and the email address of the recipient in validating the image reference;

if the image reference is determined to be valid at the image server, using the email address of the recipient in dynamically generating image data; and providing the dynamically generated image data to the recipient to display as the personalization image.

13. The method defined in claim 1 wherein there is an image server associated with the organization and wherein the image server and the gateway share a secret, the method further comprising:
- at the gateway, using the shared secret and an email address associated with the recipient in computing at least part of an image reference, wherein creating the email message comprises creating an email message that includes the personalization image by embedding the image reference in the email message;
- at the image server, in response to receiving the image reference from the recipient, using the shared secret and the email address of the recipient in validating the image reference;
- if the image reference is determined to be valid at the image server, hashing the email address of the recipient and a secret and using the result as an input to a image generation function to dynamically generate image data; and
- providing the dynamically generated image data to the recipient to display as the personalization image.

14. The method defined in claim 1 wherein there is an image server associated with the organization and wherein the image server and the gateway share a secret, the method further comprising:
- at the gateway, using the shared secret and an email address of the recipient in computing at least part of an image reference, wherein creating the email message comprises creating an email message that includes the personalization image by embedding the image reference in the email message;
- at the image server, in response to receiving the image reference from the recipient, using the shared secret and the email address of the recipient in validating the image reference;
- if the image reference is determined to be valid at the image server, using the image reference in a database lookup operation at the image server to retrieve image data for the personalization image to provide to the recipient.

15. A method for communicating securely in a system in which message content is to be sent over a communications network from a first entity to a second entity, wherein the second entity has an associated personalization image, comprising:
- at the first entity, encrypting the message content;
- at the first entity, creating an email message that includes the encrypted content, the personalization image associated with the second entity, and instructions regarding verification of the personalization image;
- sending the email message from the first entity to the second entity over an unsecured link so that the personalization image is sent in the clear;
- using an email client to display the personalization image and the instructions to the second entity for determination by visual inspection at the second entity of whether the personalization image is valid for the second entity; and
- in response to determining by visual inspection at the second entity that the personalization image is valid for the second entity, using the email client in obtaining access to an unencrypted version of the encrypted message content.

16. The method defined in claim 15 further comprising using a web browser to send the encrypted message content to a remote decryption server over the communications network to obtain access to the unencrypted version of the encrypted message content.

17. The method defined in claim 15 further comprising:
- launching a decryption engine at the second entity by clicking on an email attachment containing the encrypted message content; and
- using the decryption engine and a symmetric key to obtain access to the unencrypted version of the encrypted message content.

18. The method defined in claim 15 wherein creating the email message that includes the personalization image associated with the second entity comprises using an email address associated with the second entity and a secret as inputs to a hash function, using a resulting output from the hash function as part of a path in an image reference, and embedding the image reference in the email message.

19. A method for combating phishing attacks on users associated with an organization, wherein each user has an associated personalization image, the method comprising:
- sending an email message from the organization to a given one of the users, wherein the email message includes the personalization image of the user and a web link;
- at the user, using an email client to display the email message containing the personalization image and the web link to determine by visual inspection whether the personalization image is valid for the user;
- in response to determining by visual inspection at the user that the personalization image is valid for the user, using a web browser at the user to send a page request to the organization to access a web page associated with the web link;
- at the organization, identifying the user associated with the page request using information in the page request; and
- at the organization, providing a web page in response to the page request that includes the personalization image for the identified user.

20. The method defined in claim 19 further comprising storing the information in the page request that identifies the user in a cookie at the user.

* * * * *